United States Patent
Murphey et al.

(10) Patent No.: US 12,130,866 B1
(45) Date of Patent: *Oct. 29, 2024

(54) CREATING A CORRELATION SEARCH

(71) Applicant: Splunk Inc., San Francisco, CA (US)

(72) Inventors: Lucas Murphey, Wadsworth, IL (US); David Hazekamp, Tinley Park, IL (US)

(73) Assignee: Splunk, Inc., San Francisco, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/114,423

(22) Filed: Dec. 7, 2020

Related U.S. Application Data

(63) Continuation of application No. 15/688,323, filed on Aug. 28, 2017, now Pat. No. 10,860,655, which is a continuation of application No. 14/448,081, filed on Jul. 31, 2014, now abandoned.

(60) Provisional application No. 62/027,242, filed on Jul. 21, 2014.

(51) Int. Cl.
  *G06F 16/30* (2019.01)
  *G06F 16/903* (2019.01)
  *G06F 16/9032* (2019.01)
  *G06F 16/906* (2019.01)
  *G06F 16/907* (2019.01)

(52) U.S. Cl.
  CPC .... *G06F 16/90335* (2019.01); *G06F 16/9032* (2019.01); *G06F 16/906* (2019.01); *G06F 16/907* (2019.01)

(58) Field of Classification Search
  None
  See application file for complete search history.

(56) References Cited

U.S. PATENT DOCUMENTS

| | | |
|---|---|---|
| 5,428,737 A | 6/1995 | Li et al. |
| 6,041,331 A | 3/2000 | Weiner et al. |
| 6,510,406 B1 | 1/2003 | Marchisio |
| (Continued) | | |

OTHER PUBLICATIONS

Sunderic et al. "SQL Server 2000 Stored Procedure Programming", 2001 McGraw-Hill/Osborne.

(Continued)

*Primary Examiner* — Polina G Peach
(74) *Attorney, Agent, or Firm* — Shook, Hardy & Bacon L.L.P.

(57) ABSTRACT

One or more processing devices receive a definition of a search query for a correlation search of a data store, the data store comprising time-stamped events that each include raw machine data reflecting activity in an information technology environment and produced by a component of the information technology environment, receive a definition of a triggering condition to be evaluated based on aggregated statistics of values of one or more fields of a dataset produced by the search query, receive a definition of one or more actions to be performed when the triggering condition is satisfied, generate, using search processing language, a statement to define the search query and the triggering condition, and in view of the results of the execution of the search processing language, cause generation of the correlation search using the defined search query, the triggering condition, and the one or more actions, the correlation search comprising updated search processing language having the search query and a processing command for criteria on which the triggering condition is based.

20 Claims, 35 Drawing Sheets

(56) References Cited

U.S. PATENT DOCUMENTS

| | | | |
|---|---|---|---|
| 7,146,416 B1 | 12/2006 | Yoo et al. | |
| 7,149,983 B1 | 12/2006 | Robertson et al. | |
| 7,225,187 B2* | 5/2007 | Dumais | G06F 16/9538 |
| | | | 707/999.005 |
| 7,228,348 B1 | 6/2007 | Farley | |
| 7,720,843 B2* | 5/2010 | Brunner | G06F 16/951 |
| | | | 707/754 |
| 8,078,571 B2* | 12/2011 | Eagan | G06F 16/2272 |
| | | | 709/224 |
| 8,099,683 B2* | 1/2012 | Garbow | G06F 16/2428 |
| | | | 707/754 |
| 8,145,726 B1 | 3/2012 | Roche | |
| 8,190,593 B1* | 5/2012 | Dean | G06F 16/951 |
| | | | 707/707 |
| 8,271,692 B1* | 9/2012 | Dinh | G06F 3/0676 |
| | | | 702/56 |
| 8,301,535 B1 | 10/2012 | Zerenner | |
| 8,412,696 B2 | 4/2013 | Zhang | |
| 8,589,399 B1 | 11/2013 | Lee | |
| 8,589,403 B2 | 11/2013 | Marquardt | |
| 8,666,928 B2 | 3/2014 | Tunstall-Pedoe | |
| 8,682,925 B1 | 3/2014 | Marquardt | |
| 9,509,765 B2 | 11/2016 | Pal et al. | |
| 9,647,904 B2* | 5/2017 | Lissack | H04L 41/5051 |
| 9,767,219 B2 | 9/2017 | Wong | |
| 2002/0022942 A1* | 2/2002 | Nakamura | G06F 11/3447 |
| | | | 702/182 |
| 2002/0154010 A1* | 10/2002 | Tu | G06Q 10/10 |
| | | | 340/517 |
| 2002/0183988 A1* | 12/2002 | Skaanning | G06N 7/005 |
| | | | 703/2 |
| 2002/0184134 A1* | 12/2002 | Olsen | G06Q 40/06 |
| | | | 705/37 |
| 2002/0198985 A1* | 12/2002 | Fraenkel | H04L 41/5009 |
| | | | 709/224 |
| 2003/0130998 A1* | 7/2003 | Fox | G06F 16/951 |
| 2003/0177112 A1 | 9/2003 | Gardner | |
| 2003/0236996 A1* | 12/2003 | Himmel | G06F 21/6218 |
| | | | 726/30 |
| 2004/0030685 A1 | 2/2004 | Helles et al. | |
| 2004/0041838 A1* | 3/2004 | Adusumilli | G06F 16/284 |
| | | | 715/772 |
| 2004/0098478 A1 | 5/2004 | Koetke et al. | |
| 2004/0172177 A1* | 9/2004 | Nagai | G07C 5/085 |
| | | | 701/33.4 |
| 2004/0220921 A1 | 11/2004 | Billock et al. | |
| 2005/0021537 A1 | 1/2005 | Brendle et al. | |
| 2005/0021998 A1 | 1/2005 | Fiedler et al. | |
| 2005/0060693 A1 | 3/2005 | Robison et al. | |
| 2005/0065914 A1* | 3/2005 | Chang | G06F 16/24534 |
| 2005/0283753 A1 | 12/2005 | Ho et al. | |
| 2006/0059142 A1 | 3/2006 | Zvinyatskovsky et al. | |
| 2006/0101002 A1 | 5/2006 | Peterson et al. | |
| 2006/0190498 A1 | 8/2006 | Pruet | |
| 2007/0226171 A1 | 9/2007 | Medicke et al. | |
| 2007/0255512 A1* | 11/2007 | Delenstarr | G16B 50/00 |
| | | | 702/179 |
| 2008/0127120 A1* | 5/2008 | Kosche | G06F 11/3447 |
| | | | 717/127 |
| 2008/0133486 A1 | 6/2008 | Fitzgerald et al. | |
| 2008/0201303 A1 | 8/2008 | Bragiel et al. | |
| 2008/0215546 A1 | 9/2008 | Baum et al. | |
| 2008/0235199 A1 | 9/2008 | Li et al. | |
| 2008/0244429 A1 | 10/2008 | Stading | |
| 2009/0125482 A1 | 5/2009 | Peregrine et al. | |
| 2009/0228464 A1 | 9/2009 | Jones et al. | |
| 2009/0287685 A1 | 11/2009 | Charnock et al. | |
| 2010/0037289 A1 | 2/2010 | Roy et al. | |
| 2010/0070484 A1 | 3/2010 | Kraft et al. | |
| 2010/0131537 A1 | 5/2010 | Mayer et al. | |
| 2010/0185651 A1 | 7/2010 | Crow et al. | |
| 2011/0225116 A1 | 9/2011 | Gupta et al. | |
| 2012/0158679 A1 | 6/2012 | Anderson | |
| 2012/0239435 A1* | 9/2012 | Ennett | G16H 10/40 |
| | | | 705/3 |
| 2012/0246303 A1 | 9/2012 | Petersen et al. | |
| 2013/0041899 A1 | 2/2013 | Simske et al. | |
| 2013/0124553 A1 | 5/2013 | Velusamy | |
| 2013/0318236 A1* | 11/2013 | Coates | H04L 41/22 |
| | | | 709/224 |
| 2013/0318603 A1 | 11/2013 | Merza | |
| 2013/0326620 A1 | 12/2013 | Merza et al. | |
| 2014/0019909 A1 | 1/2014 | Leonard et al. | |
| 2014/0160238 A1 | 6/2014 | Yim et al. | |
| 2014/0173148 A1* | 6/2014 | Ma | G06F 13/4027 |
| | | | 710/113 |
| 2014/0236889 A1 | 8/2014 | Vasan et al. | |
| 2014/0236890 A1 | 8/2014 | Vasan et al. | |
| 2014/0324862 A1 | 10/2014 | Bingham et al. | |
| 2015/0006122 A1* | 1/2015 | Du | G06F 7/58 |
| | | | 703/2 |
| 2015/0039757 A1 | 2/2015 | Petersen et al. | |
| 2015/0269839 A1* | 9/2015 | Itaya | G08G 1/0108 |
| | | | 340/934 |
| 2015/0312125 A1* | 10/2015 | Subramanian | H04L 43/0876 |
| | | | 709/224 |
| 2016/0344758 A1* | 11/2016 | Cohen | G06F 3/04842 |
| 2017/0140405 A1* | 5/2017 | Gottemukkala | G06Q 30/0206 |

OTHER PUBLICATIONS

Krishnan, R et al., "The Spindle Disruption-Tolerant Networking System" Military Communications Conference, 2007. MILCOM 2007. IEEE.

Bitincka, Ledion, et al., "Optimizing Data Analysis with a Semi-Structured Time Series Database", Splunk Inc., 2010 pp. 1-9.

Carasso, David, "Exploring Splunk Search Processing Language (SPL) Primer and Cookbook", Splunk Inc., 2012, CITO Research, New York, 154 Pages.

http://docs.splunk.com/Documentation/PCI/2.1.1/ [000119] User/IncidentReviewdashboard, 2 Pages (Last accessed Aug. 5, 2014).

VSphere Monitoring and Performance, VMware, Inc., Update 1, vSphere 5.5, EN-001357-02, 2010-2014, pp. 1-174, http:/fpubs.vmware.com/vsphere-55/topic/com_vmware.ICbase/PDF/vsphere-esxi-vcenter-server-51-monitoring-performance-guide.pdf.

M Burkhart, M Strasser, D Many, X Dimitropoulos, "SEPIA: Privacy-preserving aggregation of multi-domain network events and statistics", 2010, Network, usenix.org (Year: 2010).

USPTO, Office Action for U.S. Appl. No. 14/448,081, mailed Jan. 15, 2015.

USPTO, Final Office Action for U.S. Appl. No. 14/448,081, mailed Apr. 28, 2015.

USPTO, Office Action for U.S. Appl. No. 14/448,081, mailed Dec. 2, 2016.

USPTO, Final Office Action for U.S. Appl. No. 14/448,081, mailed Apr. 21, 2017.

USPTO, Office Action for U.S. Appl. No. 14/448,081, mailed Jun. 20, 2019.

USPTO, Advisory Action for U.S. Appl. No. 14/448,081, mailed Jun. 30, 2017.

USPTO, Office Action for U.S. Appl. No. 15/688,323, mailed Jul. 30, 2019.

USPTO, Final Office Action for U.S. Appl. No. 15/688,323, mailed Nov. 21, 2019.

USPTO, Office Action for U.S. Appl. No. 15/688,323, mailed Apr. 17, 2020.

USPTO, Notice of Allowance for U.S. Appl. No. 15/688,323, mailed Aug. 6, 2020.

* cited by examiner

Original Search: 501
search "error | stats count BY host

Sent to peers: 502
search "error | prestats count BY host (map)

Executed by search head: 503
Merge prestats results received from peers (reduce)

CREATING A CORRELATION SEARCH

RELATED APPLICATION

The present application is a continuation of U.S. patent application Ser. No. 15/688,323, filed Aug. 28, 2017, which is a continuation of U.S. patent application Ser. No. 14/448,081, filed Jul. 31, 2014, now abandoned, which claims the benefit of U.S. Provisional Patent Application No. 62/027,242 filed Jul. 21, 2014, which are each hereby incorporated by reference herein.

TECHNICAL FIELD

The present disclosure relates to correlation searches and, more particularly, to creating a correlation search.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure will be understood more fully from the detailed description given below and from the accompanying drawings of various implementations of the disclosure.

Figure 22:
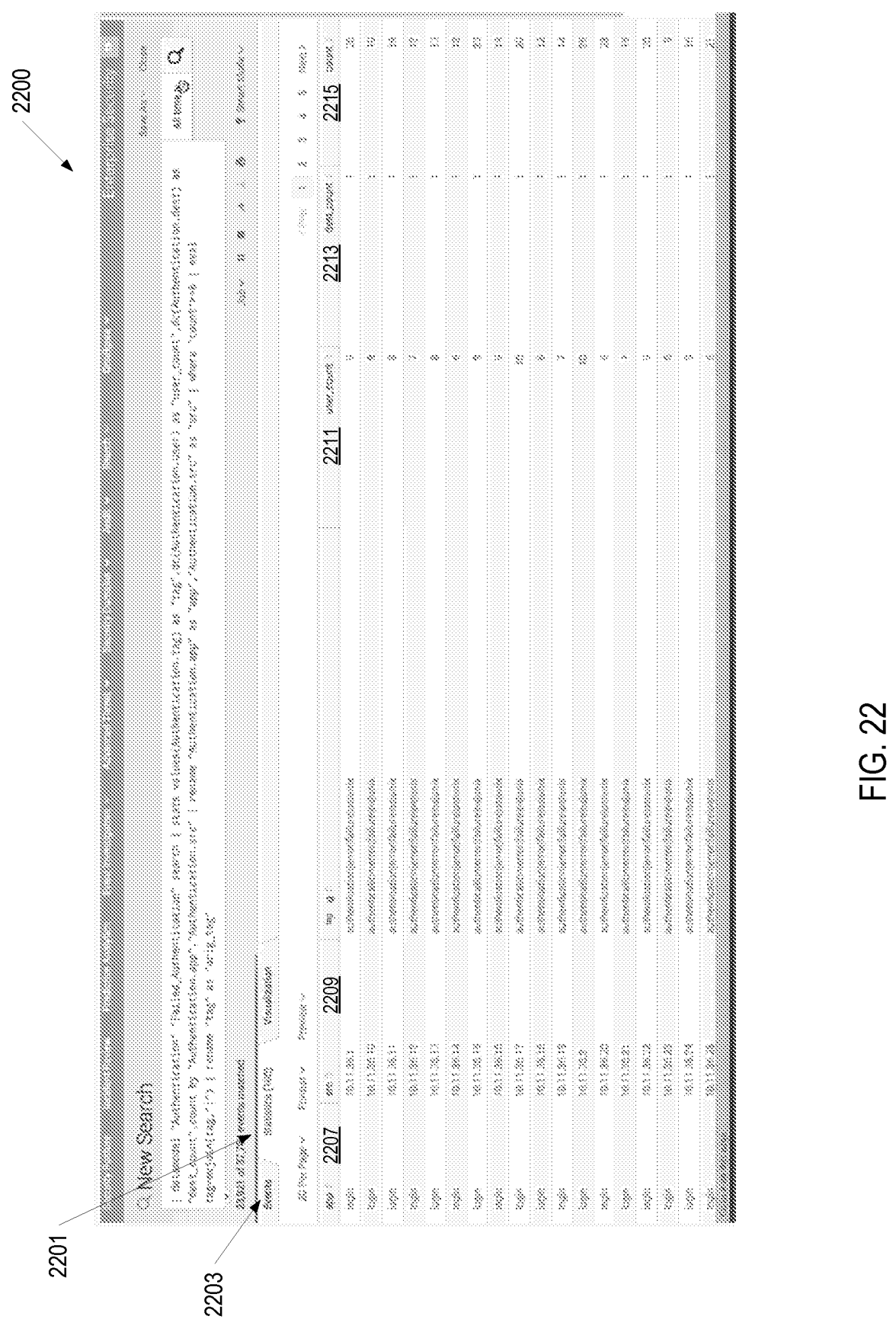

FIGS. 21-22 illustrate example GUIs, pertaining to a wizard, for testing the search query with the triggering condition, in accordance with one or more aspects of the present disclosure.

Figure 23:
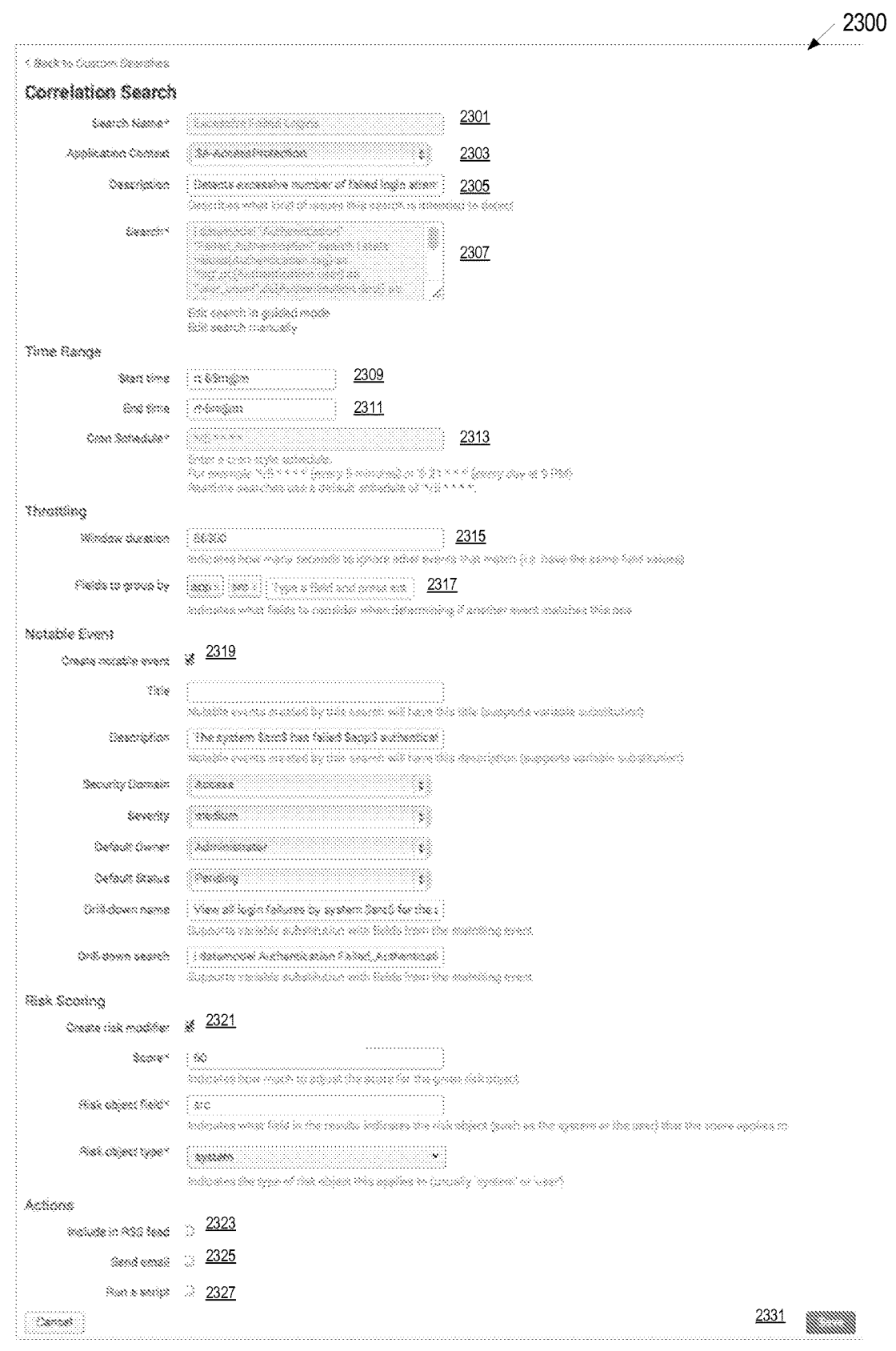

FIG. 23 illustrates an example of a GUI of a wizard for defining one or more actions for a correlation search, in accordance with one or more aspects of the present disclosure.

FIG. 34 illustrates an exemplary search query received from a client and executed by search peers in accordance with one or more aspects of the present disclosure.

FIG. 35B illustrates a data summary dialog that enables a user to select various data sources in accordance with one or more aspects of the present disclosure.

DETAILED DESCRIPTION

Figure 1:
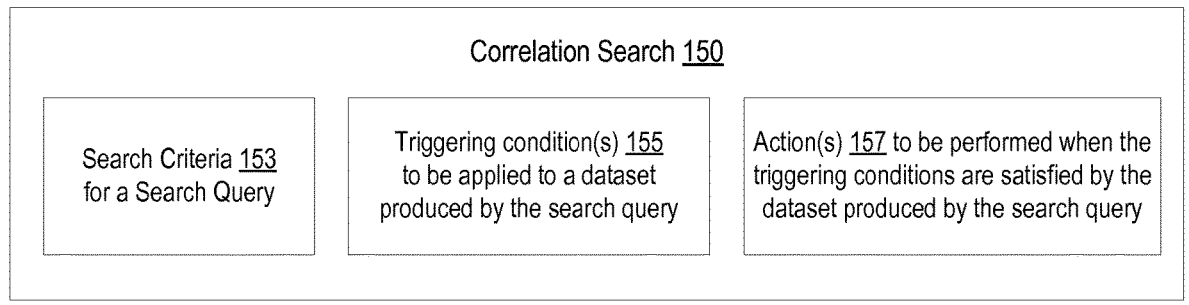
FIG. 1 illustrates an example data structure that can be utilized by the systems and methods described herein for creating and/or editing a correlation search via a wizard, in accordance with one or more aspects of the present disclosure.

The present disclosure is directed to a wizard for generating a correlation search. A correlation search (also referred to as a trigger-based search) represents a search query that has a triggering condition and one or more actions that correspond to the trigger condition.

An example data aggregation and analysis system can aggregate heterogeneous machine-generated data received from various sources, including servers, databases, applications, networks, etc. The aggregated source data can include multiple events. An event can be represented by a data structure that is associated with a certain point in time and comprises a portion of raw machine data (i.e., machine-generated data). Events are described in greater detail below in conjunction with FIG. 31. The system can be configured to perform real-time indexing of the source data and to execute real-time, scheduled, or historic searches on the source data.

The example data aggregation and analysis system can provide a wizard that facilitates user input to create and edit correlation searches more efficiently than traditional solutions by guiding a user through the creation process with tools within the wizard. A wizard hereinafter refers to a sequence of graphical user interfaces (GUIs) that lead a user through a series of stages for achieving a certain result (e.g., the creation of a correlation search).

When a search query is executed, the search query can produce a dataset (hereinafter also referred to as "results") that satisfies the search criteria for the search query. The example data aggregation and analysis system can execute a search query to evaluate the data relative to the search criteria to produce a resulting dataset. The resulting dataset may comprise one or more data items representing one or more portions of the source data that satisfy the search criteria. Alternatively, the resulting dataset may just include an indication that the search criteria have been satisfied. Yet alternatively, the resulting dataset may include a number indicating how many times the search criteria have been satisfied.

The heterogeneous machine-generated data that is being searched can include logs that track login attempts that end-users make when logging into various applications (e.g., email application, customer relationship management (CRM) application, human capital management (HCM) application, etc.). A user may wish to receive up-to-date information indicating how many application login attempts have failed and can initiate a search query to obtain results indicating the application logins attempts that may have failed.

The data in the logs can represent a large number of applications, a large number of users, and a large number of login attempts, and thus, the search results may include an extensive amount of information. The user may wish to reduce the scope of the search to a specific application. For example, the user may wish to have information indicating how many email application login attempts have failed. The user may wish to receive information only when the search results satisfy certain triggering conditions.

A triggering condition can be any condition that is intended to trigger a specific action. An example triggering condition can cause an action every time search criteria are satisfied (e.g., every time a specific user has a failed authentication attempt). Another example triggering condition can cause can action when a number specifying how many times search criteria have been satisfied exceeds a threshold (e.g., when the number of failed authentication logins of a specific user exceeds 5). Yet another example triggering condition pertains to aggregating a dataset returned by the search query to form statistics pertaining to one or more attributes of the dataset that were used for aggregation, where the example triggering condition can cause an action when the aggregated statistics exceeds a threshold, is less than a threshold, or falls within a specified range. For example, a dataset returned by the search query may include failed authentication attempts for logging into any application (e.g., email application, CRM application, HCM application, etc.) and initiated by numerous source IP (Internet Protocol) addresses; the dataset may be aggregated to produce counts of failed authentication attempts on a per application per source basis (i.e., first aggregated by application and then further aggregated by source); and the triggering condition may include triggering an action when any of the counts exceeds a threshold. For example, the user may wish to receive information only when six or more login attempts for the email application have failed within the last hour. It should be noted that in some implementations, the evaluation of the aggregated statistics can be handled as part of the search query, and not as part of the triggering condition.

Implementations of the present disclosure provide a wizard for facilitating user input for creating and editing correlation searches. The wizard can include one or more GUIs, which each can include various GUI elements, to facilitate user input that defines search criteria for a search query, input that defines one or more trigger conditions pertaining to the dataset produced by the search query, and input that specifies one or more actions to take when the one or more trigger conditions are met for creating and/or editing a correlation search.

FIG. 1 illustrates an example data structure that can be utilized by the systems and methods described herein for creating and/or editing a correlation search via a wizard, in accordance with one or more aspects of the present disclosure. As schematically illustrated by FIG. 1, a correlation search 150 can include search criteria 153 for a search query, one or more triggering conditions 155 to be applied to a dataset that is produced by the search query, and one or more actions 157 to be performed when the triggering conditions 155 are satisfied by the dataset that is produced by the search query.

FIGS. 2-23 illustrate examples of GUIs pertaining to a wizard, which can be rendered by a client computing device, for creating and/or editing a correlation search, in accordance with one or more aspects of the present disclosure.

Figure 2:
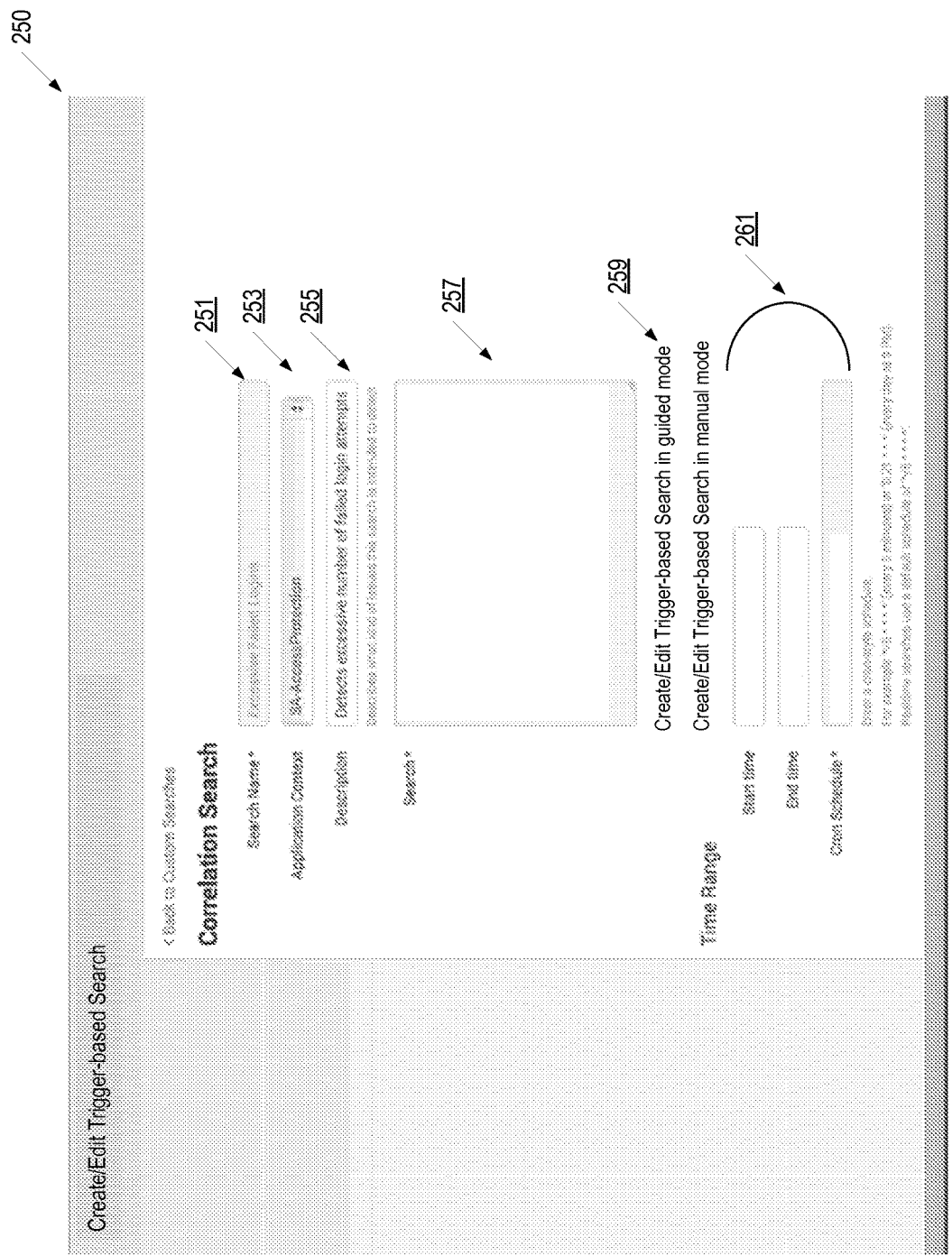
FIG. 2 illustrates an example portion of a graphical user interface (GUI) of a wizard for initiating a guided mode for creating and/or editing a correlation search, in accordance with one or more aspects of the present disclosure.

FIG. 2 illustrates an example portion of an overview GUI 250 of a wizard for creating and/or editing a correlation search, in accordance with one or more aspects of the present disclosure. As illustrated by FIG. 2, the client computing device can render the GUI 250. The wizard can include a collection of GUIs. The GUIs of the wizard can include one or more GUI elements to receive input and to display data. The GUI elements can include, for example, and are not limited to, a text box, a button, a link, a selection button, a drop down menu, a sliding bar, a selection button, etc.

The GUI 250 can receive user input specifying the name of the correlation search via a text box 251. If the correlation search specified in the text box 251 has been previously created, the GUI 250 can display information about that correlation search. For example, the GUI 250 can display application context (e.g., a particular application) 253 pertaining to the correlation search, the description 255 of the correlation search, a search query presented in the search processing language 257 for the correlation search, and time parameters 261 for the search query. The GUI 250 may also display additional information about the correlation search (e.g., one or more actions to be taken when a triggering condition of the correlation search is met), as will be discussed in more detail below in conjunction with FIG. 23.

The user can view the displayed information about the correlation search and modify data displayed in the GUI 250 to edit the correlation search. The GUI 250 can include a link 259, which can be selected, to initiate a guided mode for editing a correlation search. The guided mode can present a sequence of additional GUIs of the wizard, starting with GUI 350 discussed in more detail below in conjunction with FIG. 3.

Alternatively, if the correlation search specified in text box 251 has not been previously created, the creation of a new correlation search can begin, which may involve receiving user input identifying application context 253 and a description 255 for the new correlation search, and receiving user selection of link 259 to initiate a guided mode for creating the new correlation search. In response to the user selection of link 259, GUI 350 of FIG. 3 can be displayed to the user.

Figure 3:
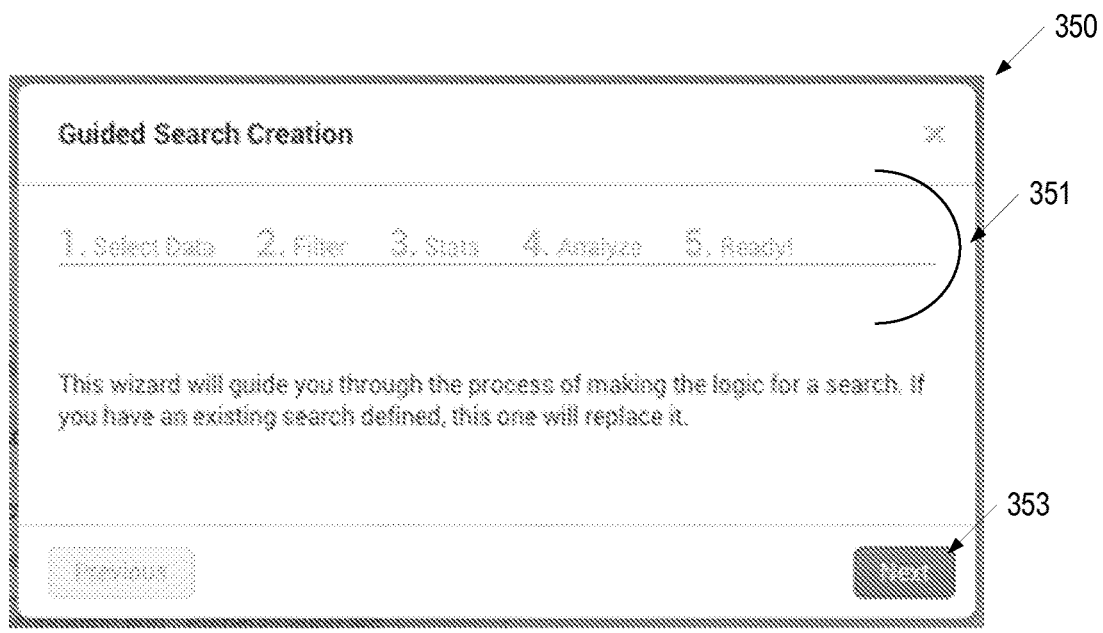
FIG. 3 illustrates an example of a GUI of a wizard for providing an overview of the stages pertaining to the creation and/or editing of a correlation search, in accordance with one or more aspects of the present disclosure.

FIG. 3 illustrates an example of a GUI 350 of a wizard for providing an overview of the stages pertaining to the creation and/or editing of a correlation search, in accordance with one or more aspects of the present disclosure. One or more GUIs of the wizard can include GUI elements (e.g., buttons) to allow a user to request a GUI that is next in the sequence of GUIs or that is a previous GUI in the sequence of GUIs. For example, GUI 350 can include a button 353 that can be selected to request the next GUI in the sequence of GUIs of the wizard.

In one implementation, the stages 351 presented in the GUI 350 include (i) defining the data (e.g., events) to be searched, followed by (ii) defining how to filter the data that is to be searched, followed by (iii) defining how to aggregate the dataset that is produced by the search query, followed by (iv) defining a triggering condition, followed by (v) defining actions to be performed when the triggering condition is met.

Figure 19:
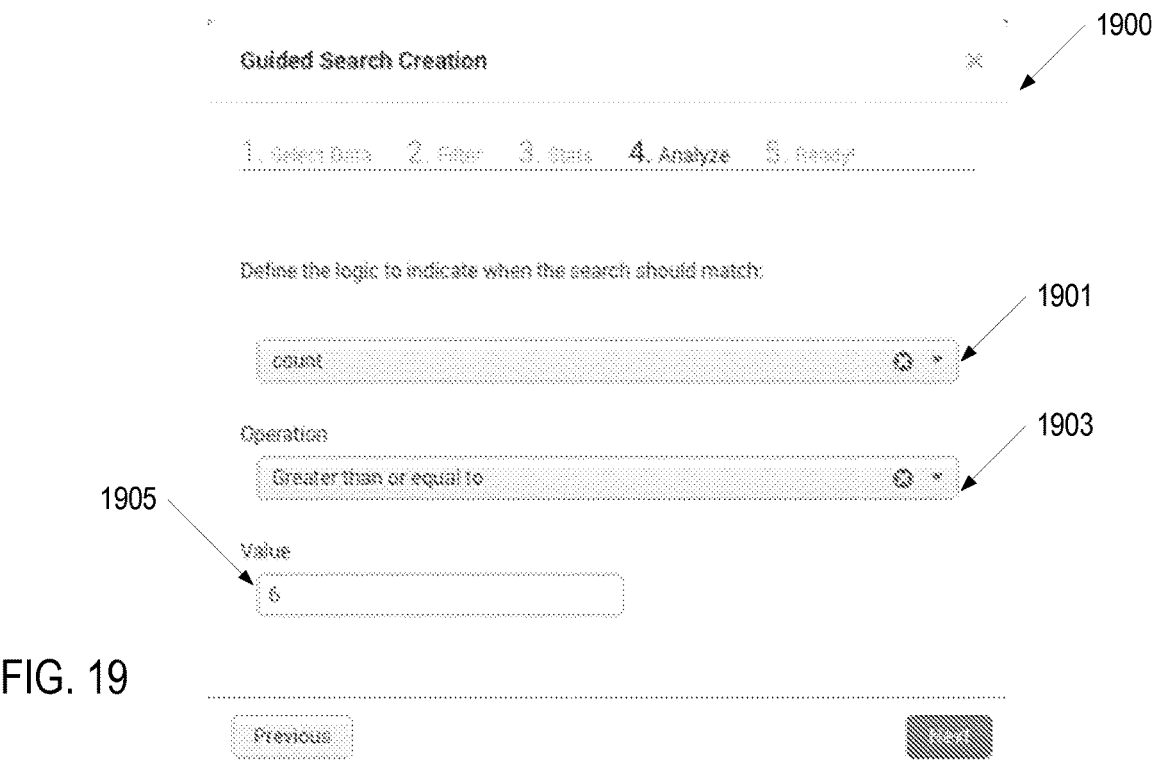
FIG. 19 illustrates an example of a GUI of a wizard for defining one or more triggering conditions for a correlation search, in accordance with one or more aspects of the present disclosure.
Figure 20:
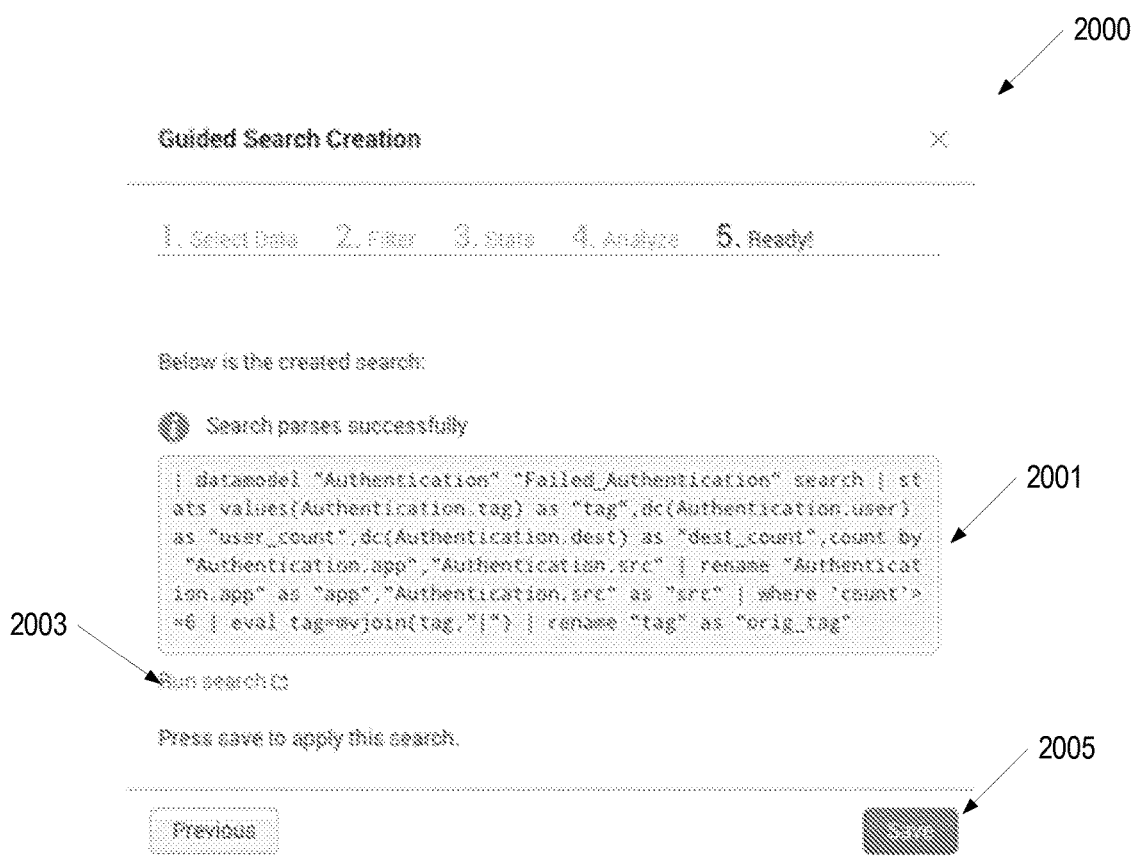
FIG. 20 illustrates an example of a GUI of the wizard for testing the execution of the search query with the triggering condition, in accordance with one or more aspects of the present disclosure.
Figure 21:
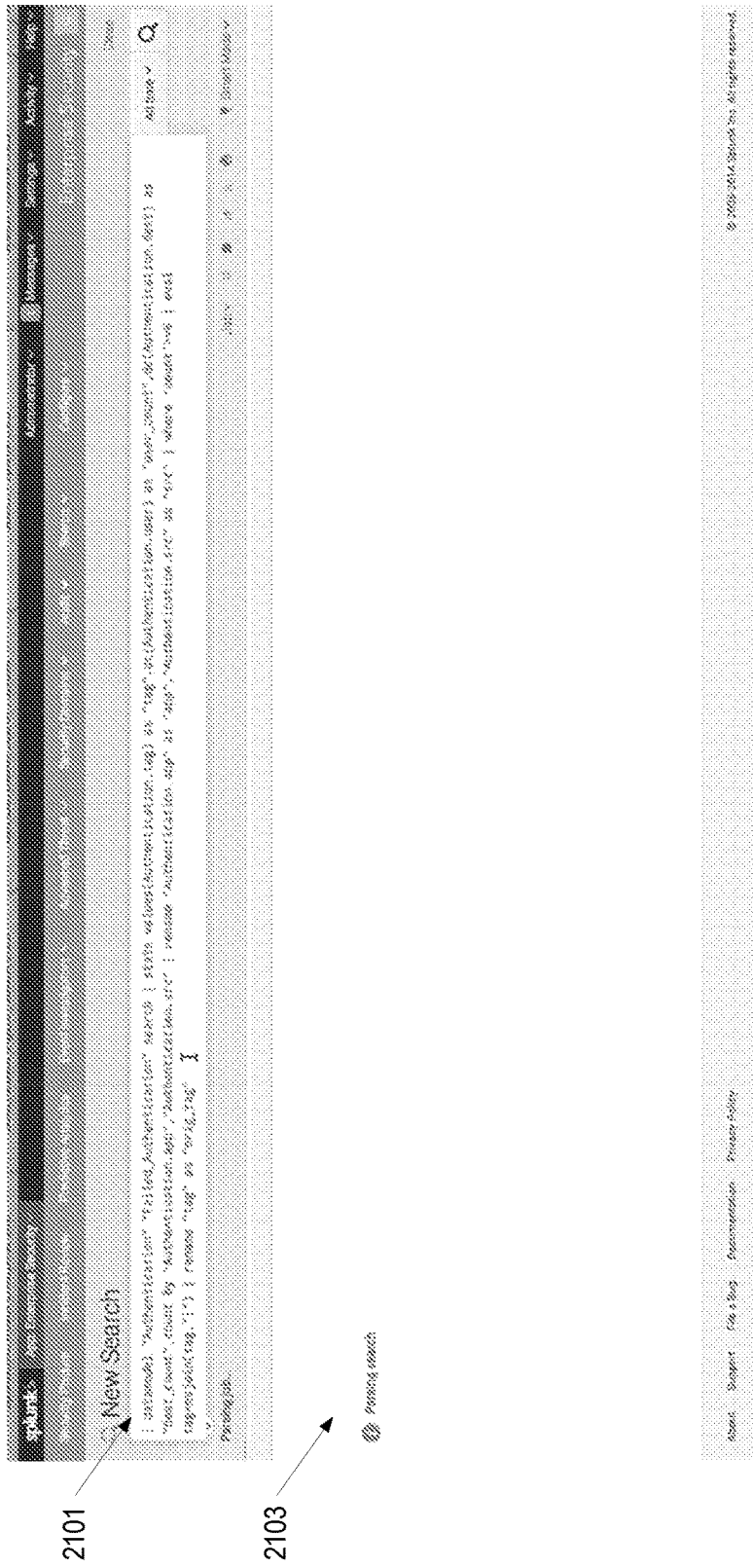

FIGS. 4-18, which are described in greater detail below, illustrate examples of GUIs of a wizard for defining a search query for a correlation search, in accordance with one or more aspects of the present disclosure. Defining a search query can include selecting the data of interest, filtering the data, and aggregating the data. FIG. 19, which is described in greater detail below, illustrates an example GUI of the wizard for defining a triggering condition for a correlation search, in accordance with one or more aspects of the present disclosure. FIGS. 20-22, which are described in greater detail below, illustrate examples of GUIs for testing the search criteria and the triggering condition, in accordance with one or more aspects of the present disclosure. FIG. 23, which is described in greater detail below, illustrates an example GUI of the wizard for defining one or more actions to be performed for the correlation search, in accordance with one or more aspects of the present disclosure.

Figure 4:
FIG. 4 illustrates an example of a GUI of a wizard for defining data to be searched for a search query of a correlation search, in accordance with one or more aspects of the present disclosure.

FIG. 4 illustrates an example of a GUI 450 of a wizard for defining data to be searched using a search query of a correlation search, in accordance with one or more aspects of the present disclosure. As described above, the data aggregation and analysis system can aggregate heterogeneous machine-generated data received from various sources (e.g., servers, databases, applications, networks, etc.). A user may not be interested in searching the entire source data, but may be interested in searching a subset of the data, for example, only the source data that pertains to authentication, and in particular, failed application login attempts. For example, the heterogeneous machine-generated data can include logs pertaining to multiple applications which end-users are logging into. The logs may be provided by various hardware vendors and software vendors and can be in different formats.

The data aggregation and analysis system can provide one or more pre-built, pre-defined data models and/or one or more pre-built lookup files to allow the data (e.g., logs), which are in the various formats, to be searched uniformly irrespective of the particular vendor that is providing the data. The data aggregation and analysis system can also provide one or more GUIs to facilitate user input for creating a data model, data sub-model, and/or a lookup file.

A lookup file is a file that includes data fields for a particular set of events. For example, a lookup file can include data fields for events pertaining to network assets. The lookup file can include fields representing an IP address, a server name, a user device identifier, etc. In one implementation, a lookup file is in a CSV (comma separated value) file format.

A data model is a hierarchically structured search-time mapping of semantic knowledge about one or more datasets. The data model encodes the domain knowledge necessary to build a variety of specialized searches of those datasets. Examples of a pre-built data model can include, and are not limited to, data models pertaining to authentication, databases, electronic mail, intrusion detection, malware, application state, alerts, compute inventory, network sessions, network traffic, performance, audits, updates, and vulnerabilities.

A data model can include one or more data sub-models to group data according to certain criteria (thereby grouping together data of a common type). For example, the authentication data model can pertain to events for all types of authentication (e.g., successful authentication, failed authentication, privileged authentication). There can be data sub-models for the authentication data model to group data pertaining to certain groups of events. For example, the authentication data model can have a "Successful_Authentication" data sub-model, a "Failed_Authentication" data sub-model, a "Privileged_Authentication" data sub-model, etc. A user that is interested in only failed login attempts can select the "Failed_Authentication" data sub-model to further narrow the scope of the data to be searched to data pertaining to failed authentication.

Each data model or sub-model can have attributes (also hereinafter referred to as "fields") that are included in one or more events in the model or sub-model. For example, the authentication data model can have fields that are related to events pertaining to authentication. For example, the authentication data model can have a field indicating the machine for which a login is being attempted, a field indicating the status of whether the login attempt is successful or has failed, a field indicating the time the login attempt was made, etc.

A data sub-model is a child of a parent data model. It includes a subset of the events include in the parent data model. In one implementation, a data sub-model may have one or more attributes that its parent has, and it may have additional attributes that its parent doesn't have. For example, the data sub-model "Failed_Authentication" can be a child of the "Authentication" data model and the events in the "Failed_Authentication" data sub-model may be a subset of the events in the "Authentication" data model.

The events included in a data model or sub-model may be enumerated. Alternatively, the events that should be included may be defined by a search query, so the actual events in the data model or sub-model depends on the data to which the data model or sub-model is applied.

Figure 5:
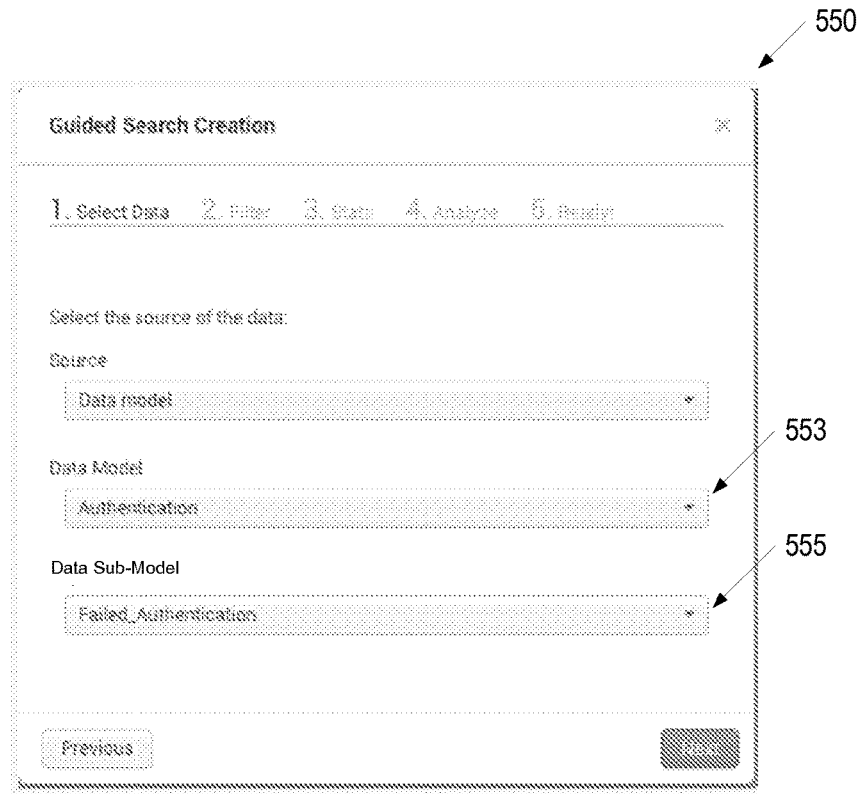
FIG. 5 illustrates an example of a GUI of a wizard for defining characteristics of a data source for the data model source type, in accordance with one or more aspects of the present disclosure.
Figure 9:
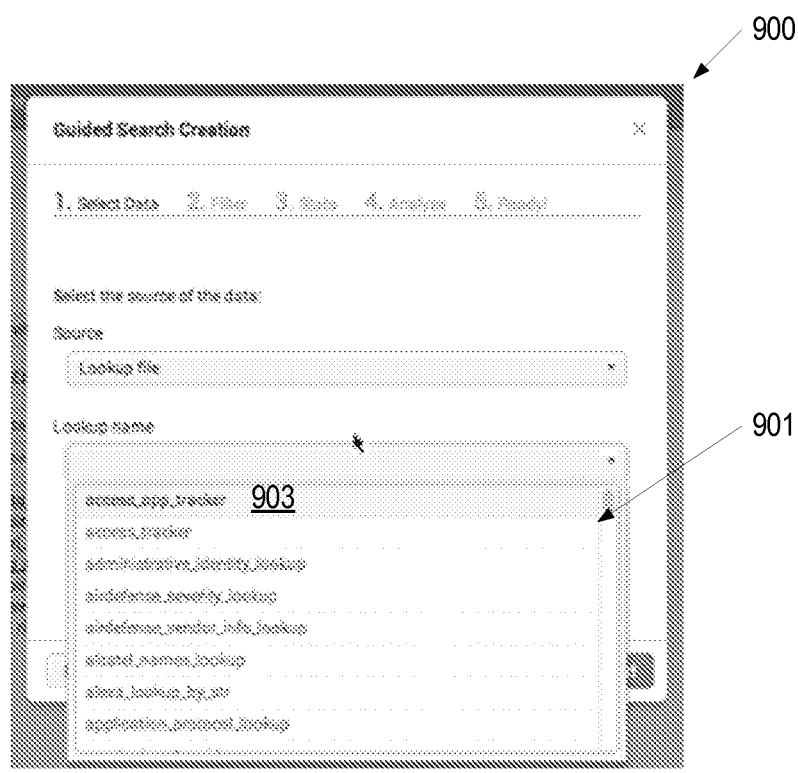
FIG. 9 illustrates an example of a GUI of a wizard of options of pre-built lookup files, in accordance with one or more aspects of the present disclosure.

The GUI 450 can include a drop-down menu 451 to present data source options, such as a data model or a lookup file or any other source of data that is amenable to a search query. For example, a user that is interested in information pertaining to authentication, and in particular, application login attempts, may select "Data model" as the source type from the drop-down menu 451. In response, GUI 550 of FIG. 5 is presented. Alternatively, if a user selects "Lookup file" as the source type from the drop-down menu 451, GUI 900 of FIG. 9 is presented.

FIG. 5 illustrates an example of a GUI 550 of a wizard for defining characteristics of a data source for the data model source type, in accordance with one or more aspects of the present disclosure. When the data model is selected as a type of data source, the GUI 550 can include a drop-down menu 553 to provide the options of the pre-built data models, which a user can select, and a drop-down menu 555 to provide the options of the pre-built data sub-models, which a user can select. For example, a user can select an "Authentication" data model to search the data (e.g., logs) pertaining to authentication and a "Failed_Authentication" data sub-model.

Figure 6:
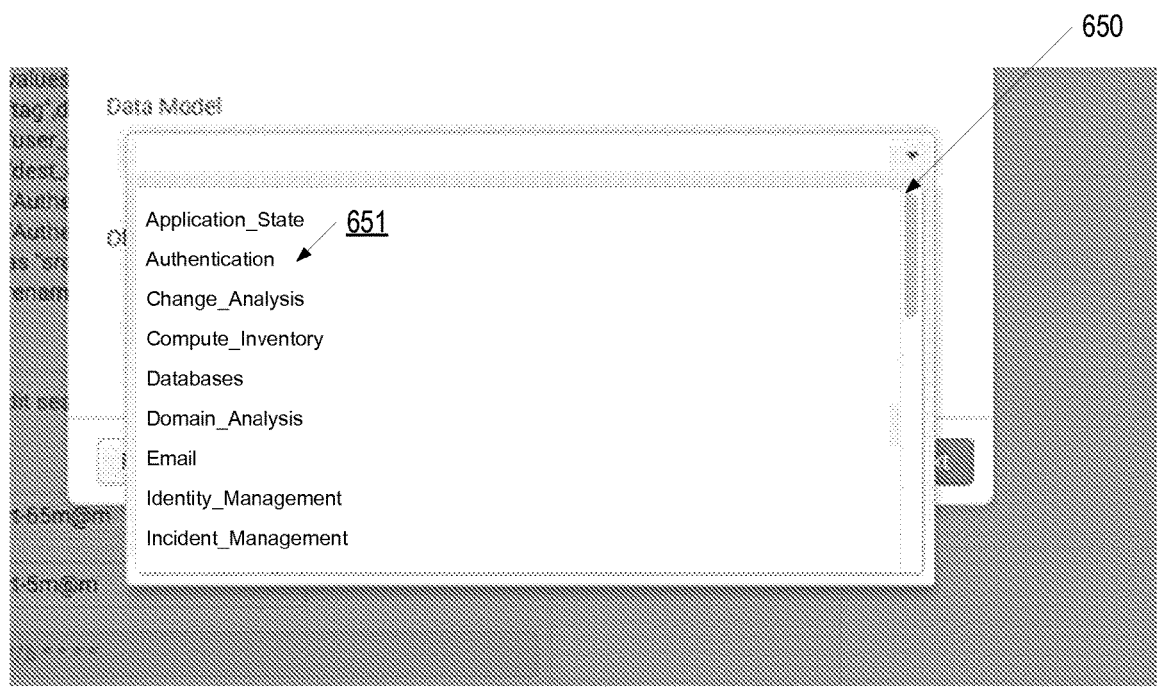
FIG. 6 illustrates an example list of options of the pre-built data models, which a user can select from a drop-down menu, in accordance with one or more aspects of the present disclosure.
Figure 7:
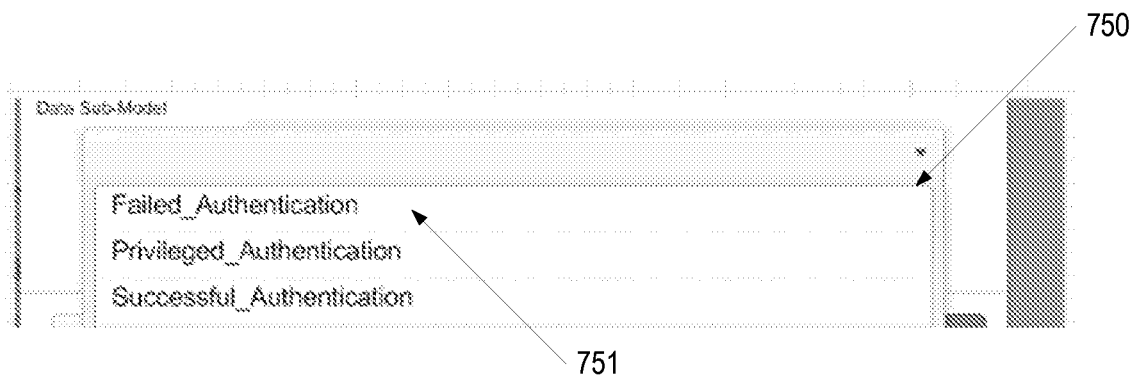
FIG. 7 illustrates an example list of options of the pre-built data sub-models, which a user can select from a drop-down menu, in accordance with one or more aspects of the present disclosure.

FIG. 6 illustrates an example list 650 of options of the pre-built data models, which a user can select from a drop-down menu (e.g., drop-down menu 553 in FIG. 5), in accordance with one or more aspects of the present disclosure. When a data model (e.g., Authentication data model 651) is selected, the wizard can present options of the pre-built data sub-models that are associated with the selected data model. FIG. 7 illustrates an example list 750 of options of the pre-built data sub-models, which a user can select from a drop-down menu (e.g., drop-down menu 555 in FIG. 5), in accordance with one or more aspects of the present disclosure. A user may select, for example, a Failed_Authentication data sub-model 751.

The data aggregation and analysis system can provide one or more GUIs to present the fields for a data model and can provide one or more GUIs to present the fields for a data sub-model. These GUIs may be part of the wizard and accessible via a link, a tab, etc. included in one or more GUIs of the wizard. Alternatively, these GUIs may not be part of the wizard and may be accessible via a link, a tab, etc. included in different GUIs provided by the data aggregation and analysis system.

Figure 8:
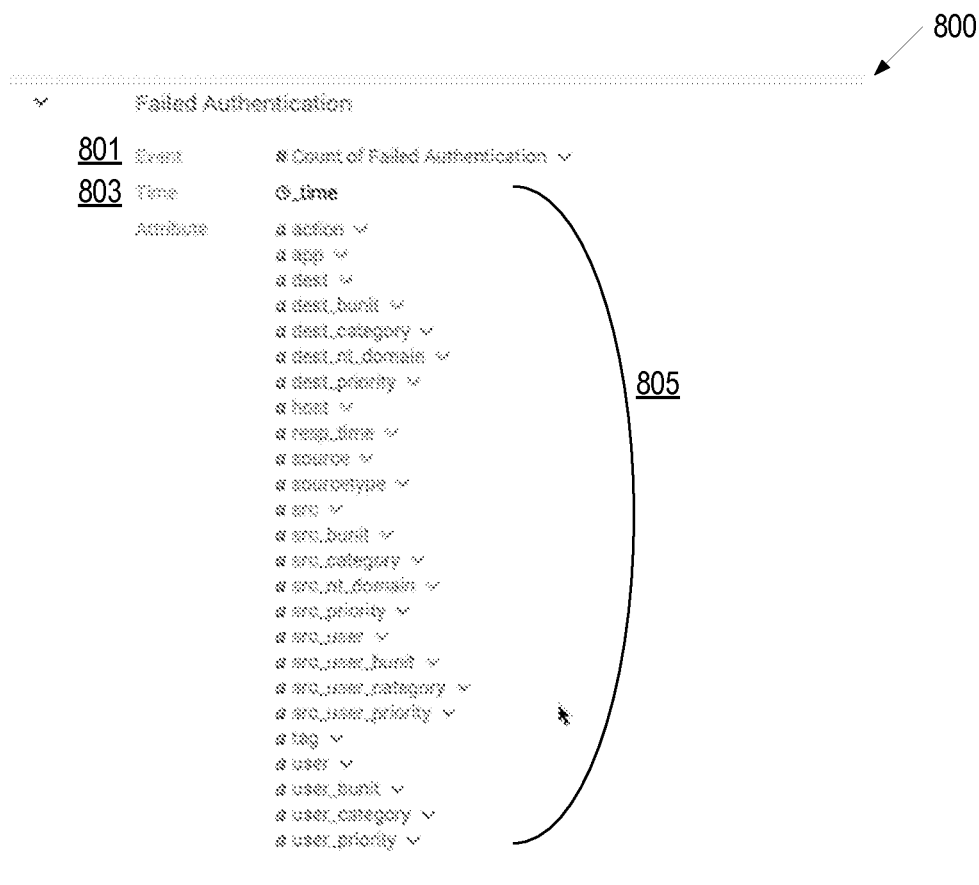
FIG. 8 illustrates an example of a GUI for presenting the fields of a data sub-model, in accordance with one or more aspects of the present disclosure.

FIG. 8 illustrates an example of a GUI 800 for presenting the fields of a data sub-model (e.g., Failed_Authentication data sub-model), in accordance with one or more aspects of the present disclosure. The GUI 800 can also present the type of events 801 for the selected data sub-model, the attributes 805 for the selected data sub-model, including a time attribute 803 (e.g., timestamp) for the selected data sub-model.

When a user selects "Lookup file" as the source type from the drop-down menu 451 of FIG. 4, GUI 900 of FIG. 9 is presented. FIG. 9 illustrates an example of a GUI 900 of a wizard for presenting options of pre-built lookup files, which a user can select from a drop-down menu, in accordance with one or more aspects of the present disclosure. The GUI 900 can include a list 901 of options of the pre-built lookup files. A user may select the lookup file "access_app_tracker" 903, which includes one or more fields pertaining to all of the applications that have been accessed. The "access_app_tracker" lookup file can be used, for example, to create a correlation search to determine when a particular application is being accessed excessively.

Figure 10:
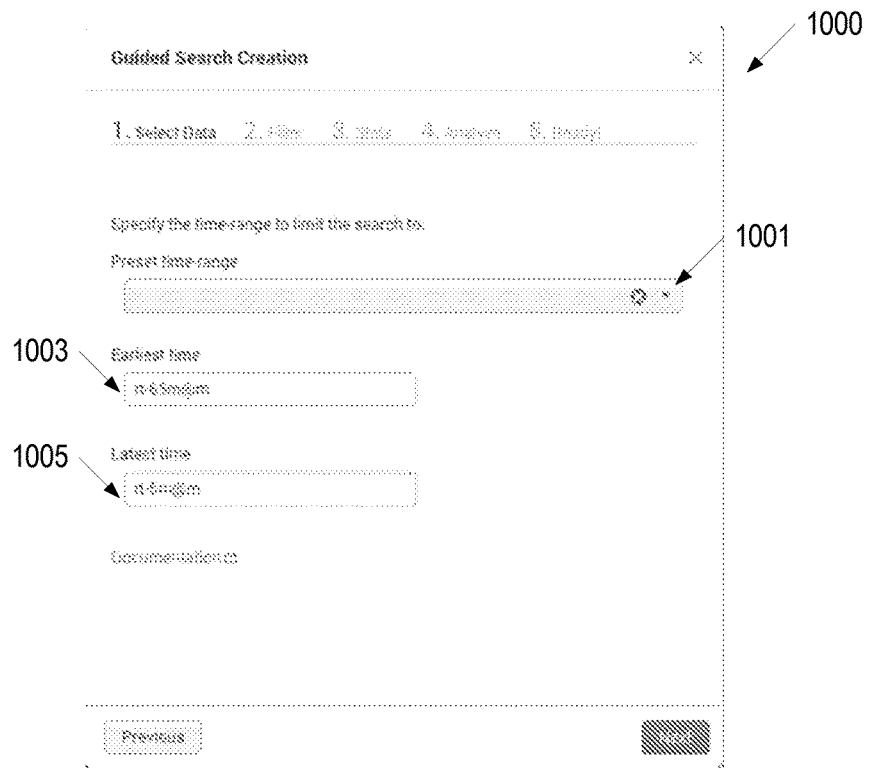
FIG. 10 illustrates an example GUI of a wizard for defining a time range pertaining to the source data to be searched using the search query of the correlation search, in accordance with one or more aspects of the present disclosure.
Figure 11:
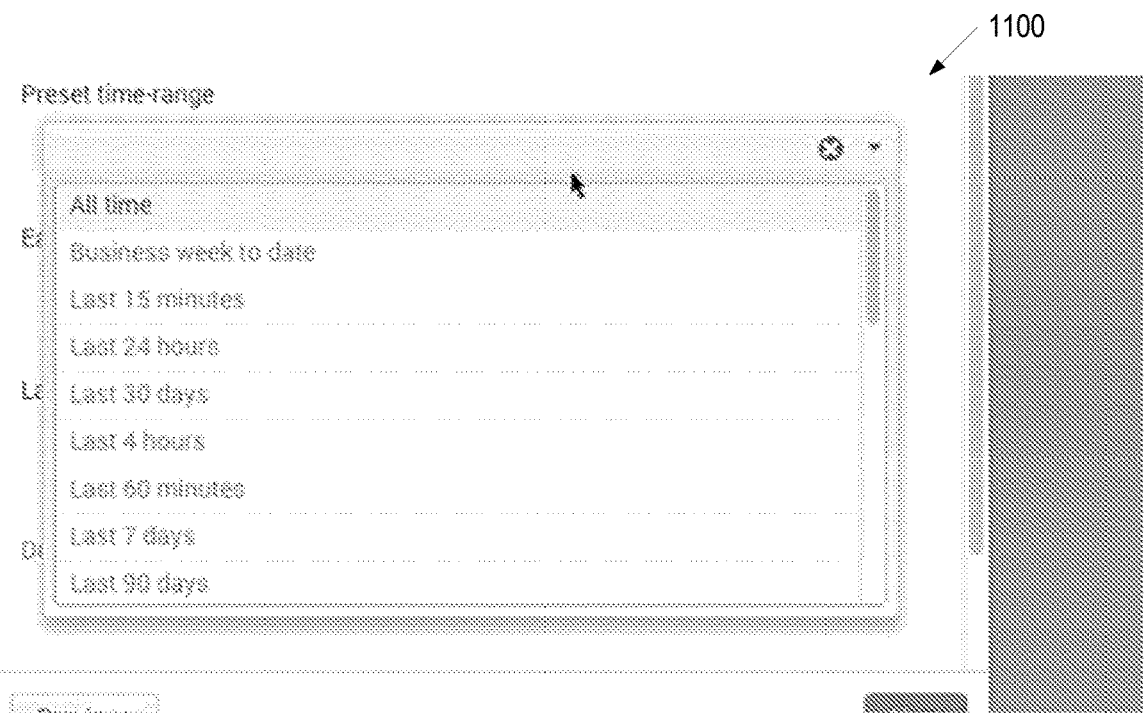
FIG. 11 illustrates an example drop-down menu including various time range options for user selection, in accordance with one or more aspects of the present disclosure.

FIG. 10 illustrates an example GUI of a wizard for defining a time range pertaining to the source data to be searched using the search query of the correlation search, in accordance with one or more aspects of the present disclosure. The heterogeneous machine-generated data is apportioned into events, as described in greater detail below in conjunction with FIG. 31. Each event includes a timestamp. The time range specified via GUI 1000 is the time period defining the scope of the data that is to be searched. When the search query for the correlation search is executed, the search query can be applied to events that have timestamps that are within the specified time range. The time range can be defined as a rolling window. The rolling time window may be defined relative to the "current time" moment. GUI 1000 can include user interface (UI) elements to receive input specifying a time range. For example, GUI 1000 can allow a user to select a predefined time range from a drop-down menu 1001. FIG. 11 illustrates an example drop-down menu 1100 including various time range options for user selection, in accordance with one or more aspects of the present disclosure.

Referring to FIG. 10, the GUI 1000 can also include text boxes 1003, 1005 to allow the user to define a custom time range for the source data to be searched. For example, the user can specify an earliest time of 65 minutes and a latest time of 5 minutes, which should result in searching for the events, relating to failed login attempts that have a timestamp that is between 5 minutes and 65 minutes prior to "current time." Once the time range is specified by the user (e.g., using drop-down menu 1001 or text box 1003 and text box 1005), the time range can also be displayed in another GUI, such as an overview GUI (e.g., GUI 200 in FIG. 2) of the wizard.

Figure 12:
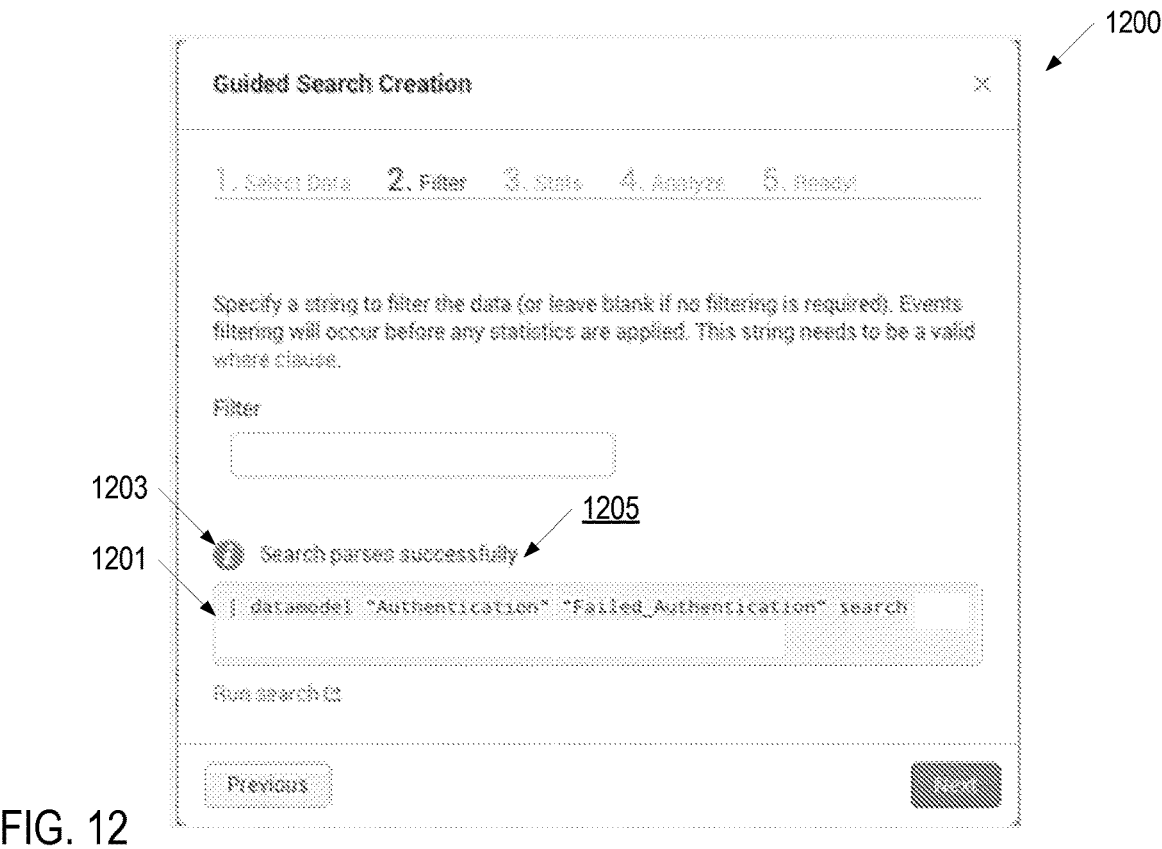
FIG. 12 illustrates an example GUI of a wizard for displaying a search query in the search processing language, in accordance with one or more aspects of the present disclosure.

One or more GUIs of the wizard can display the search query in the search processing language that was automatically created based on the user input that has been received in the wizard (e.g., via some of the GUIs of FIGS. 4 through 11). FIG. 12 illustrates an example GUI 1200 of a wizard for displaying a search query in the search processing language, in accordance with one or more aspects of the present disclosure. For example, input may have been received selecting the data to be searched. For example, the input may be the selection of the data model "Authentication" and the data sub-model "Failed_Authentication". The GUI 1200 can include a text box 1201 that displays the search query as a search query string in the search processing language that was created based on the input of the data model "Authentication" and the data sub-model "Failed_Authentication". An implementation of creating a search query is described in greater detail below in conjunction with FIGS. 29A-B. The search query string, for example, in text box 1201, may comply with the syntax of a certain query language supported by the data aggregation and retrieval system, such as, and not limited to, Splunk Search Processing Language (SPL), which is further described herein below. The search query can correspond to a search processing language that uses a late binding schema.

One or more GUIs of the wizard can display indicators of indicating whether the resulting search query parses successfully. For example, referring to FIG. 12, the GUI 1200 can include icon 1203 and/or text 1205 indicating whether or not the search query as defined by the received input parses successfully.

Figure 13:
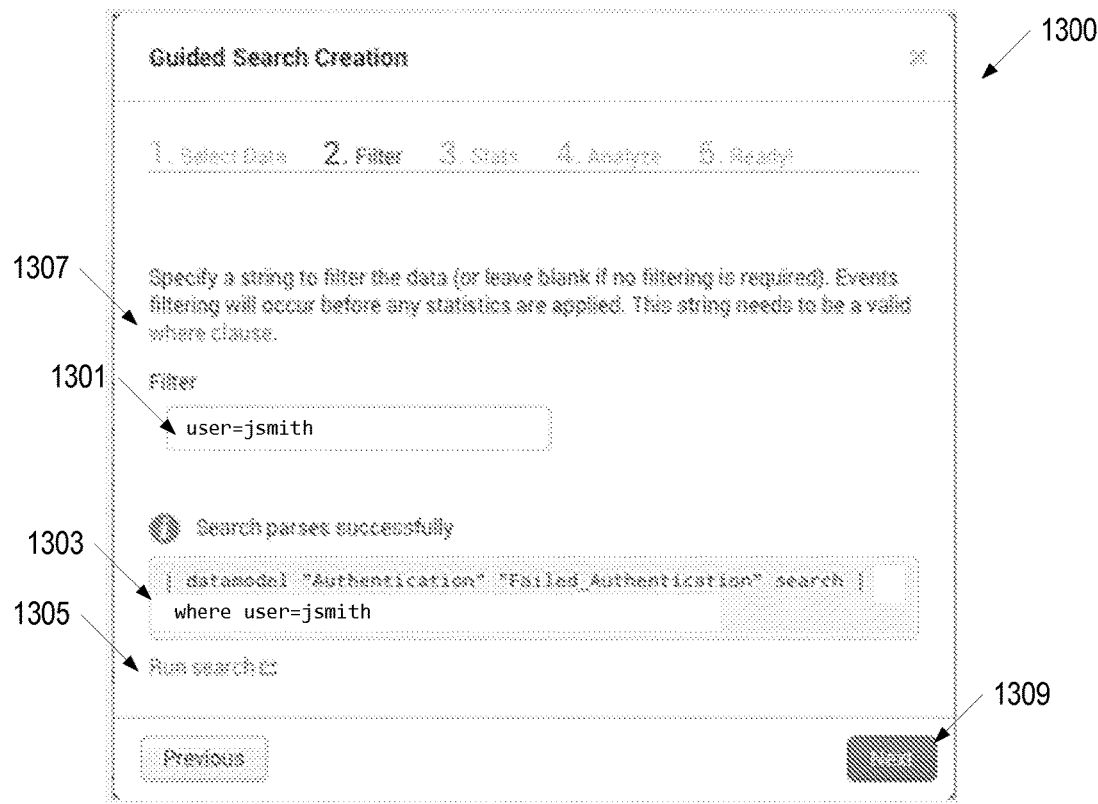
FIG. 13 illustrates an example GUI of a wizard for defining a filter for the search query of the correlation search, in accordance with one or more aspects of the present disclosure.

FIG. 13 illustrates an example GUI 1300 of a wizard for defining a filter for the search query of the correlation search, in accordance with one or more aspects of the present disclosure. The GUI 1300 can facilitate user input specifying one or more filters of the search query. For example, the wizard may have received input selecting the data to be searched as the events associated with the "Authentication" data model and the "Failed_Authentication" data sub-model. The GUI 1300 can include one or more GUI elements to receive input specifying one or more filters to be used to filter the data that is to be searched. For example, the GUI 1300 includes a text box 1301 to receive input to specify a filter. In another example, the GUI 1300 can include multiple text boxes to receive input specifying multiple filters. If no input is received via the text box 1301, the wizard does not add a filter to the search query.

The filter can include a specific field that is associated with the events that are being searched and can include a value for the specific field, in order to limit the scope of the search query to those events that have a matching value in the field specified by the filter. As described above, the wizard can include a GUI (e.g., GUI 800 in FIG. 8) that displays the fields (attributes) that are associated with a particular data model and/or data sub-model, and the filter can include a subset (one or more) of those fields and a certain value for each field in the subset.

For example, the failed authentication sub-model includes a "user" field. The search query that uses the failed authentication sub-model can be applied to events pertaining to failed authentication, and can filter the events to identify failed authentication for a particular user (e.g., jsmith). That is, the filter can be the "user" field being equated to a value (e.g., jsmith). In another example, multiple filters may be specified by user input. For example, input can be received via a text box specifying a filter based on the "user" field and input can be received via another text box specifying a filter based on an "IP address" field. When the filter is specified, the search processing language for the specified filter can be determined and can be automatically added to the search and displayed in the GUI 1300, for example, in a text box 1303. In one implementation, the search query includes a "where" clause that defines the filter. For example, "where user-jsmith" may automatically be added to the text box 1303. One implementation for determining the search processing language for the specified filter is described in greater detail below in conjunction with FIGS. 29A-B. One or more GUIs of the wizard can facilitate user input for accessing information (e.g., documentation) explaining search query parameters (e.g., parameters used in a search processing language). For example, GUI 1300 can include a link 1307 to information describing what the where clause is.

When the search query is executed, the search results should include events that have the user field equal to "jsmith". One or more GUIs of the wizard can allow the user to test the filter criteria for a search query. For example, GUI 1300 can include a link 1305 to facilitate user input to request that the filter criteria be tested by running the search query. In one implementation, when input is received requesting to test the filter criteria, the wizard causes a search GUI to be displayed.

Figure 14:
FIG. 14 illustrates an example of a GUI for testing the filter criteria for a search query, in accordance with one or more aspects of the present disclosure.

FIG. 14 illustrates an example of a GUI 1400 for testing the filter criteria for a search query, in accordance with one or more aspects of the present disclosure. GUI 1400 can display the search query, which is defined by the input facilitated by the wizard, in a text box 1401. The GUI 1400 can display the dataset that is produced by running the search query in a text box 1403. In one implementation, other GUIs of the wizard are accessible while the GUI 1400 is presented. A user can access the GUIs of the wizard to continue creating a correlation search and/or to edit the filter criteria for the search query based on the results of testing the search query.

Figure 15A:
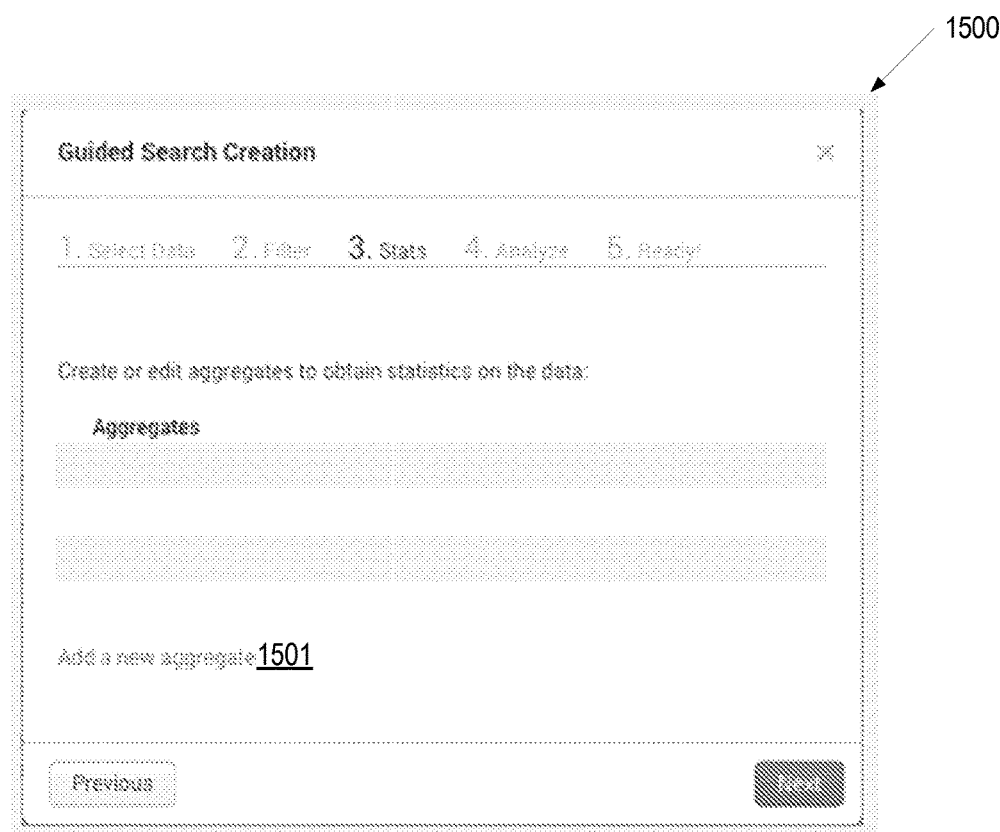
FIG. 15A illustrates an example GUI of a wizard for facilitating user input to request an aggregation of the dataset to be produced by the search query of the correlation search, in accordance with one or more aspects of the present disclosure.

As discussed above, once the search query is defined, the next stage of the wizard, which can be accessed, for example, by a user selecting a button 1309 in FIG. 13, can focus on guiding the user on how to aggregate the dataset that is produced by the search query. FIG. 15A illustrates an example GUI 1500 of a wizard for facilitating user input to request an aggregation of the dataset to be produced by the search query of the correlation search, in accordance with one or more aspects of the present disclosure. For example, the search results in the dataset can be aggregated to form statistics pertaining to one or more fields (attributes) used for aggregation. For example, the search query may produce results that include failed authentication attempts for logging into any application (e.g., email application, CRM application, HCM application, etc.) and can include failed authentication attempts that were initiated by numerous source IP (Internet Protocol) addresses. A user may wish to obtain more granular results, for example, the failed authentication attempts on a per application per source basis (i.e., first aggregated by application and then further aggregated by source). The user may also wish the aggregated results to indicate statistics on a per application per source basis. For example, the user may wish the aggregated results to indicate the count of failed authentication attempts on a per application per source basis.

Figure 15B:
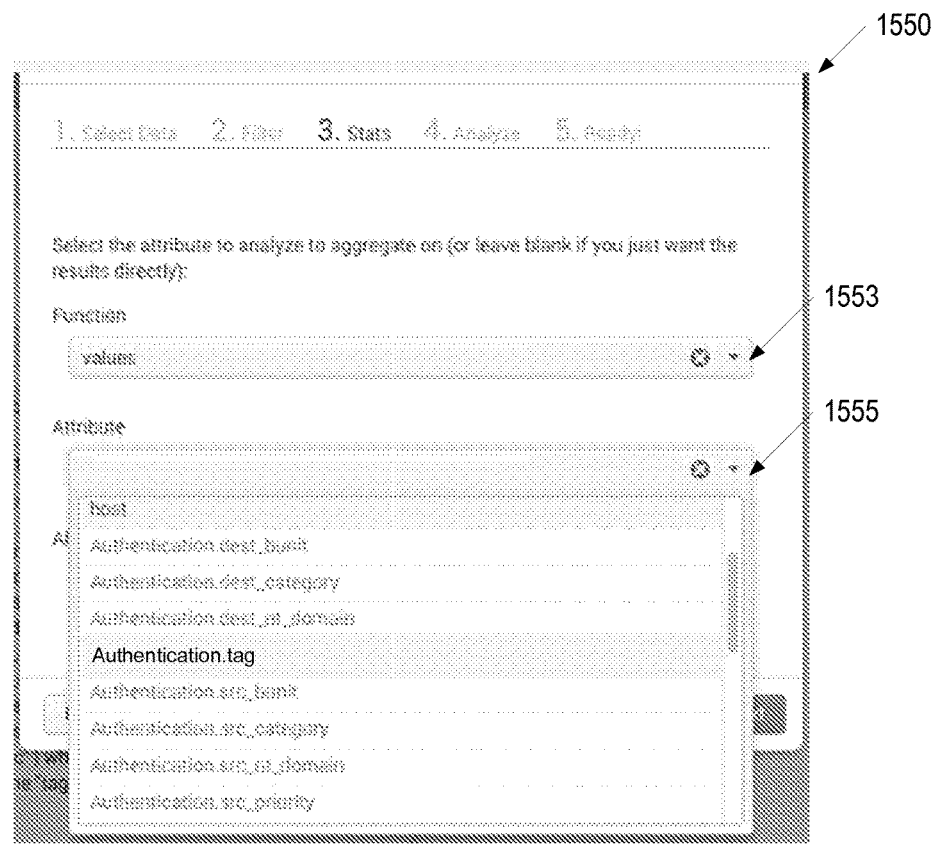
FIG. 15B illustrates an example GUI of a wizard for defining an aggregate, in accordance with one or more aspects of the present disclosure.

The GUI 1500 can include a link 1501 for creating a new aggregate which represents a desired statistic pertaining to an attribute to be used for aggregation. A search query can return individual matching events, individual portions of data matching events, records that satisfy the search criteria if the search query is applied to a relational database, and/or a result of a calculation on the data (such as an aggregate or statistic). An aggregate and/or an evaluation of an aggregate can be part of the search criteria. An aggregate is hereinafter also referred to as a "statistics type". Once the user selects link 1501, a new GUI is presented that allows the user to define the new aggregate. FIG. 15B illustrates an example GUI 1550 of a wizard for defining an aggregate, in accordance with one or more aspects of the present disclosure.

GUI 1550 can include a drop-down menu 1553 displaying options for a function which can be selected to define a function to be used for the aggregate being created. Examples of a function can include, and are not limited to, average, count, distinct count, max, mean, median, percentile, range, sum, values, etc.

The GUI 1550 can include a drop-down menu 1555 displaying options for an attribute, which can be selected for aggregation. The attributes displayed in the drop-down menu 1555 can pertain to the data model and/or data sub-model that is selected. For example, the drop-down menu 1555 displays the attributes (fields) associated with the Authentication data model and/or Failed_Authentication data sub-model.

A user may have iterated through GUI 1550 of FIG. 15B multiple times to provide user input to create three aggregates. For example, GUI 1550 of FIG. 15B may have received user input identifying a values function and a corresponding attribute "authentication tag" in a first iteration, user input identifying a distinct count function and a corresponding attribute "user" in a second iteration, and user input identifying a distinct count function and a corresponding attribute "destination" in a third iteration, in order to create the three aggregates.

Figure 16:
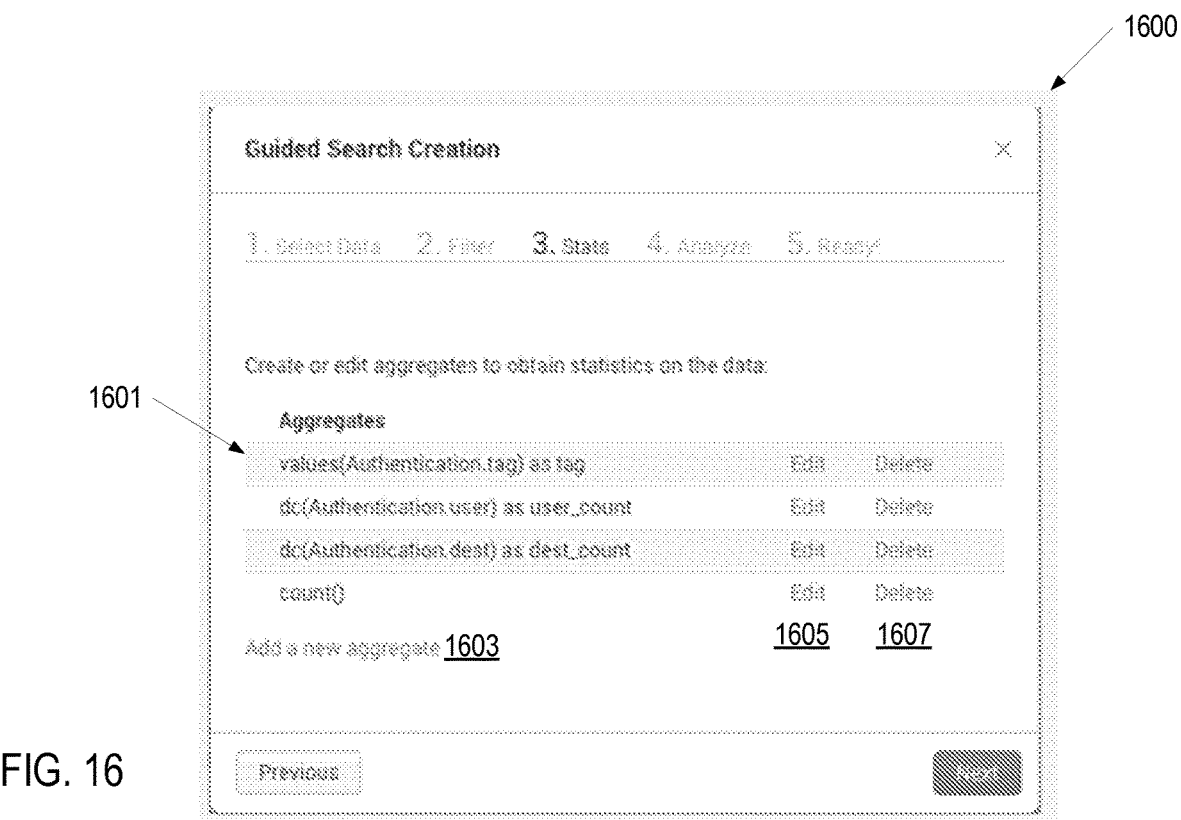
FIG. 16 illustrates an example GUI of a wizard for displaying multiple aggregates, and allowing a user to edit or delete any of the displayed aggregates, and/or to create additional aggregates, in accordance with one or more aspects of the present disclosure.

Once the user defines the aggregate(s) and/or as the user defines the aggregate(s), the aggregate(s) are displayed in a GUI of the wizard. FIG. 16 illustrates an example GUI 1600 of the wizard for displaying multiple aggregates that were defined, and allowing a user to edit or delete any of the displayed aggregates, and/or to create additional aggregates, in accordance with one or more aspects of the present disclosure. GUI 1600 can display text 1601 for the three aggregates that were created. GUI 1600 can include a link 1605 for each aggregate to edit the corresponding aggregate. GUI 1600 can include a link 1607 for each aggregate to delete the corresponding aggregate. GUI 1600 can include a link 1603 to create a new aggregate.

When executed, the values function returns the list of all distinct values of the field as a multi-value entry. For example, when executed as part of execution of the search query, the aggregate "values(Authentication.tag)" can return a list of all distinct values of the field "tag". When executed, the distinct count function returns the count of distinct values for the field. For example, when executed as part of execution of the search query, the aggregate "dc(Authentication.user)" can return the count of distinct values for the field "user". The "user" field can be a string data type and can describe the name of the user involved with the corresponding event, or who initiated the corresponding event. In another example, when executed as part of execution of the search query, the aggregate "dc(Authentication.dest)" can return the count of distinct values for the field "dest". The "dest" field can be a string data type and can describe the target involved in the authentication.

Figure 17:
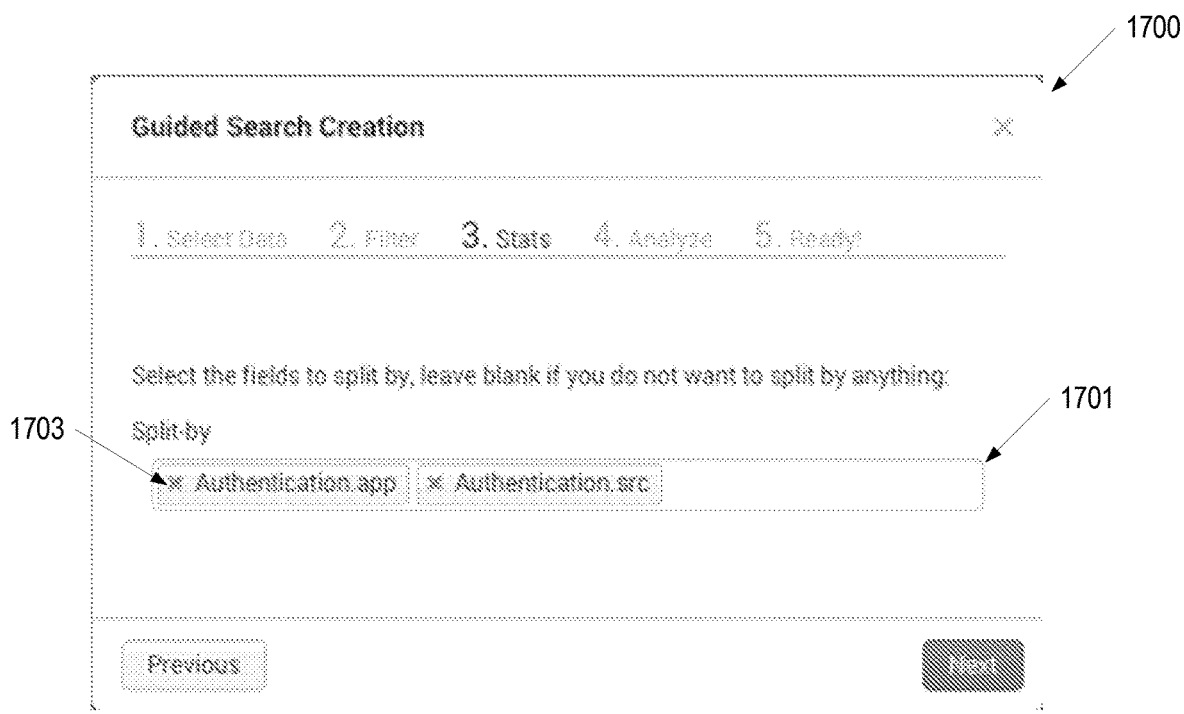
FIG. 17 illustrates an example GUI of a wizard for defining how to separate aggregated statistics pertaining to the dataset produced by a search query by fields, in accordance with one or more aspects of the present disclosure.

A user may wish that the scope of the aggregates be narrowed to result in more focused statistics. The scope of the aggregates can be narrowed by adding attributes to be used for aggregation, thereby separating aggregated statistics per the added attributes (or fields). For example, rather than just obtaining a distinct count of failed attempts per user for all applications and all sources, desired aggregate statistics can be provided for each distinct combination of an application and a source. FIG. 17 illustrates an example GUI 1700 of a wizard for defining how to separate aggregated statistics pertaining to the dataset produced by a search query by fields, in accordance with one or more aspects of the present disclosure. A "split-by" or "split-by operation" hereinafter refers to breaking down the statistics by the distinct values of one or more specified split-by field(s). A split-by operation finds the distinct values for the split-by field(s) and correlates those distinct values to the field(s) on which an aggregate or statistic is being calculated.

GUI 1700 can display the attributes (fields) that pertain to the data model and/or data sub-model that is selected and can receive user input selecting the one or more fields to use for the split-by. GUI 1700 displays the selected field(s) in a box 1701. For example, GUI 1700 displays a selection of split-by by the application (app) field and a selection of split-by the source (src) field.

GUI 1700 can include a button 1703 for each field that is selected to facilitate user input for unselecting the corresponding field. A split-by modifies how a statistic is being calculated. For example, if the split-by on the source field is selected, but the split-by on the application field is unselected, then a statistic may be calculated for the dataset produced by the search query by grouping the failed authentications for all applications together for each source IP address. Whereas, if the split-by on the application field is selected as well as the source field being selected, as illustrated in GUI 1700, then a statistic may be calculated for the dataset produced by the search query by grouping the failed authentications per distinct application and per distinct source IP address.

Figure 18:
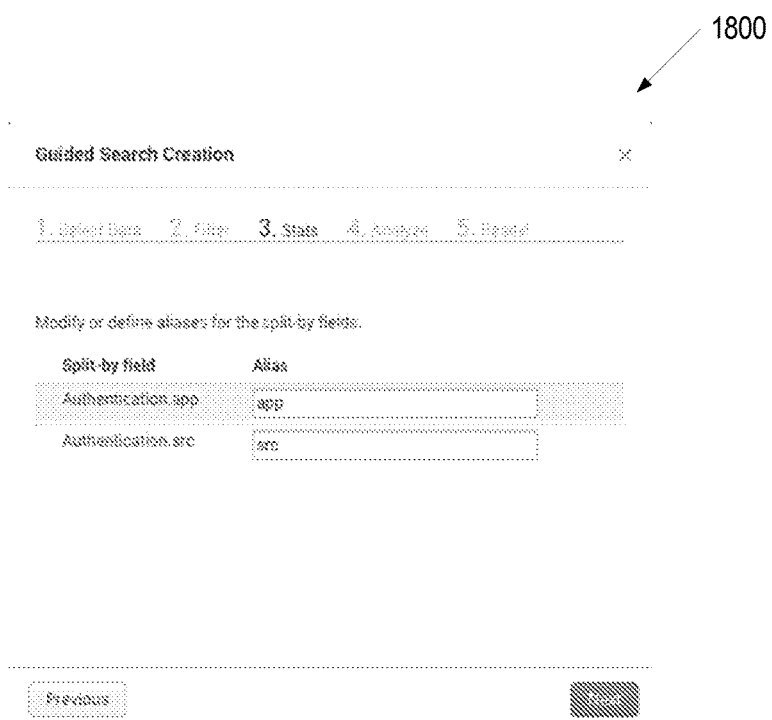
FIG. 18 illustrates an example GUI of a wizard for facilitating user input to assign an alias to a selected field for a split-by operation, in accordance with one or more aspects of the present disclosure.

FIG. 18 illustrates an example GUI 1800 of a wizard for facilitating user input to assign an alias to a selected field for a split-by operation, in accordance with one or more aspects of the present disclosure. A user can assign an alias to a split-by field. The alias can be used to identify the various groups in the dataset that is produced by the search query, in order to provide a more readable visualization of the search results. The aliases are described in greater detail below in conjunction with FIG. 22.

FIG. 19 illustrates an example of a GUI 1900 of a wizard for defining one or more triggering conditions for a correlation search, in accordance with one or more aspects of the present disclosure. A triggering condition is a condition to be applied to the dataset that is produced based on the search query of the correlation search. For example, a user may wish to trigger an action "when the dataset produced based on the search query includes at least one result having an authentication failure count of six or more over a specified time range (e.g., one hour)," where the specified time range was provided via the GUI 1000 of FIG. 10.

The aggregates that have been created for the correlation search can be used to define the triggering condition(s). GUI 1900 can display, in a drop-down menu 1901, a list of the aggregates created for the correlation search. GUI 1900 can display, in a drop-down menu 1903, operations that can be used with a selected aggregate to define the triggering condition(s). GUI 1900 can include a text box 1905 to allow a user to specify a value to be used with the operation and selected aggregate for defining the triggering condition(s). For example, to detect "when the dataset produced based on the search query includes at least one result having an authentication failure count of six or more over a specified time range (e.g., one hour)," a user may select the "count" aggregate, the "greater than or equal to "operation" and provide the value "6".

In one implementation, the GUI 1900 can facilitate user input to define more than one triggering condition for a correlation search. For example, the GUI 1900 can include UI elements for AND/OR operations. For example, a user may wish to trigger an action "when the authentication failure count is greater than or equal to 6 and less than or equal to 12". The GUI 1900 can include multiple GUI elements to facilitate user input to define multiple triggering conditions for a correlation search. For example, GUI 1901 may include multiple drop-down menus.

One or more GUIs of the wizard can facilitate user input for testing the execution of the search query with the triggering condition. FIG. 20 illustrates an example of a GUI 2000 of the wizard for testing the execution of the search query with the triggering condition, in accordance with one or more aspects of the present disclosure. GUI 2000 can display search processing language that defines the search query and the triggering condition. For example, the GUI 2000 can include a text box 2001 that displays the search processing language that corresponds to the input of the data model "Authentication" and the data sub-model "Failed_Authentication", the aggregates that are created for the correlation search, the aliases created for the correlation search, and the triggering condition. For example, the search processing language that corresponds to the triggering condition to detect "when the dataset produced based on the search query includes at least one result having an authentication failure count of six or more" can include the where clause "where 'count'>=6" as illustrated in GUI 2000. The translation of the input for creating the correlation search into corresponding search processing language is described in greater detail below in conjunction with FIGS. 29A-B.

One or more GUIs of the wizard can display one or more elements indicating whether the search query and the triggering condition as defined by the received input parses successfully. GUI 2000 can include a button 2005 to facilitate user input to save the data (e.g., input and output) pertaining to the creation and/or editing of the correlation search. Saving the data pertaining to the correlation search is described in greater detail below in conjunction with FIGS. 29A-B. GUI 2000 can include a link 2003 to facilitate user input to request that the search query and the triggering condition be tested. In one implementation, when input is received requesting to test the search criteria with the triggering condition, the wizard causes a search GUI to be displayed.

FIGS. 21-22 illustrate example GUIs, pertaining to a wizard, for testing the search query with the triggering condition, in accordance with one or more aspects of the present disclosure. Referring to FIG. 21, the GUI 2100 can display the search query and the triggering condition, which are defined by the input facilitated by the wizard, in a text box 2101. In one implementation, when input is received (e.g., selecting link 2003 in FIG. 2000) requesting to test the search criteria with the triggering condition, text box 2101 is automatically populated with the search processing language corresponding to the search query and the triggering condition. The GUI 2100 can display the dataset that is produced by executing the search query with the triggering condition in a text box 2103. In one implementation, other GUIs of the wizard are accessible while the GUI 2100 for running the search query is displayed. A user can access the GUIs of the wizard to continue creating/editing the correlation search based on the results of testing the execution of the search query and the triggering condition.

Referring to FIG. 22, the GUI 2200 can display the dataset that is produced by running the search query and the triggering condition in one or more tabbed panes 2201, 2203. GUI 2200 can include one or more tabbed panes 2201, 2203 for facilitating user input for displaying various representations of the dataset that is produced by executing the search query and the triggering condition. For example, a selection of tabbed pane 2203 can display the events that lead to the triggering condition being satisfied. In another example, a selection of tabbed pane 2201 can display the statistics that are calculated for the correlation search. The tabbed pane 2201 can display the search results based on the input of the split-by fields. For example, tabbed pane 2201 displays the search results in a tabular format having multiple columns 2207, 2209, 2211, 2213, 2215 to present data pertaining to the search results. There is a column 2207 to represent the split-by the application field and there is a column 2209 to represent the split-by the source field. The columns are displayed with the corresponding aliases that have been created for the correlation search. For example, "Authentication.app" was converted to the alias "app" and "Authentication.src" was converted to the alias "src". There is a column 2215 that represents the count aggregate that was created for the correlation search. For example, the values in the count column 2215 can represent the number of failed authentications for the particular application, source, and tag combination. For example, there have been 26 failed authentications for the application "login", source "10.11.36.1" and tag "authentication|error|failure|os|unix".

FIG. 23 illustrates an example of a GUI 2300 of a wizard for defining one or more actions for a correlation search, in accordance with one or more aspects of the present disclosure. GUI 2300 corresponds to GUI 250 of FIG. 2 discussed in detail above. GUI 2300 can present the name 2301 of the correlation search being created and/or edited, the description 2305 of the correlation search, and the application context 2303 (e.g., an application or module) associated with the correlation search.

GUI 2300 can display actions 2319, 2321, 2323, 2325, 2327 that can be performed when the results produced based on the search query satisfy the triggering condition. GUI 2300 can include one or more UI elements for each action option to further configure the actions that should be taken.

For example, when the authentication failure count is greater than or equal to six over a specified time range (e.g., one hour) for a particular application and a particular source, the selected action(s) can be performed. For example, the selected action 2319 and the selected action 2321 can be performed when the triggering condition is met.

Example actions can include, and are not limited to, presenting in a GUI a representation of an instance of the triggering condition being satisfied, adjusting a risk score, sending a notification indicating that the trigger condition is satisfied, etc. Action 2319 represents a notable event that is likely to indicate a security threat, as described in greater detail below. For example, an incident review user interface can display a notable event when the authentication failure count is greater than or equal to six over a specified time range (e.g., one hour) for a particular application and a particular source.

In another example, the data aggregation and analysis system can adjust, by a certain risk score modifier value, the risk score assigned to one or more objects responsive to determining that at least a portion of a dataset produced by the search query satisfies a particular triggering condition. Action 2321 represents adjusting a risk score. The risk score may be assigned to one or more objects. For example, when the authentication failure count is greater than or equal to six over a specified time range (e.g., one hour) for a particular application and a particular source, the risk score the particular application and/or particular host can be increased.

In other examples, the actions can include sending a notification indicating that the trigger condition is satisfied. Action 2323 represents creating an RSS feed. The RSS feed can include, for example, at least a part of the dataset that has contributed to the trigger condition being satisfied. Action 2325 represents sending an e-mail message indicating the trigger condition is satisfied. The email message can include, for example, at least a part of the dataset that has contributed to the trigger condition being satisfied. Action 2327 represents a shell script having at least one parameter defined based on the triggering condition being satisfied.

GUI 2300 can provide an overview of the correlation search as the correlation search is being created. For example, the GUI 2300 can present the search processing language 2307 for the correlation search defined as described above in conjunction with GUIs in FIGS. 2-20. The GUI 2300 can also allow the search processing language of the correlation search to be edited.

GUI 2300 can display time parameters for the correlation search in text boxes 2309,2311 as the input is received, as described above in conjunction with GUIs in FIGS. 10-11. In an illustrative example, the time parameters include a start time and end time that defines a time window specified relative to the current time.

GUI 2300 can include a schedule input element 2313 to define the schedule according to which the correlation search should be executed by the example data aggregation and analysis system. The schedule can be represented by a data structure comprising values of one or more scheduling parameters (e.g., minute, hour, day, month, and/or day-of-week).

GUI 2300 can include a throttling window input element 2315 and a grouping field selection element 2317 to define a throttling condition. The throttling condition can be utilized to suppress, for a certain period of time (e.g., for a specified number of seconds in element 2315), triggering one or more actions associated with the search query and the triggering condition. The grouping field selection element 2317 can be utilized to select a field by the value of which the search results should be grouped for evaluating the throttling condition. In other words, the actions associated with the search query and the triggering condition should be suppressed for a specified number of seconds for the search results that include the same value in the specified field (e.g., the same application identifier in the "app" field and the same source identifier in the "src" field shown in the grouping field selection element 2317 in the illustrative example GUI 2300).

GUI 2300 can include a button 2331 to facilitate user input for saving the correlation search and any data pertaining to creation and/or editing of the correlation search. In one implementation, the data pertaining to creation and/or editing of the correlation search is saved locally. In another implementation, the data pertaining to creation and/or editing of the correlation search is saved remotely. The data pertaining to creation and/or editing of the correlation search can include the input received and any output produced from the input.

Figure 24:
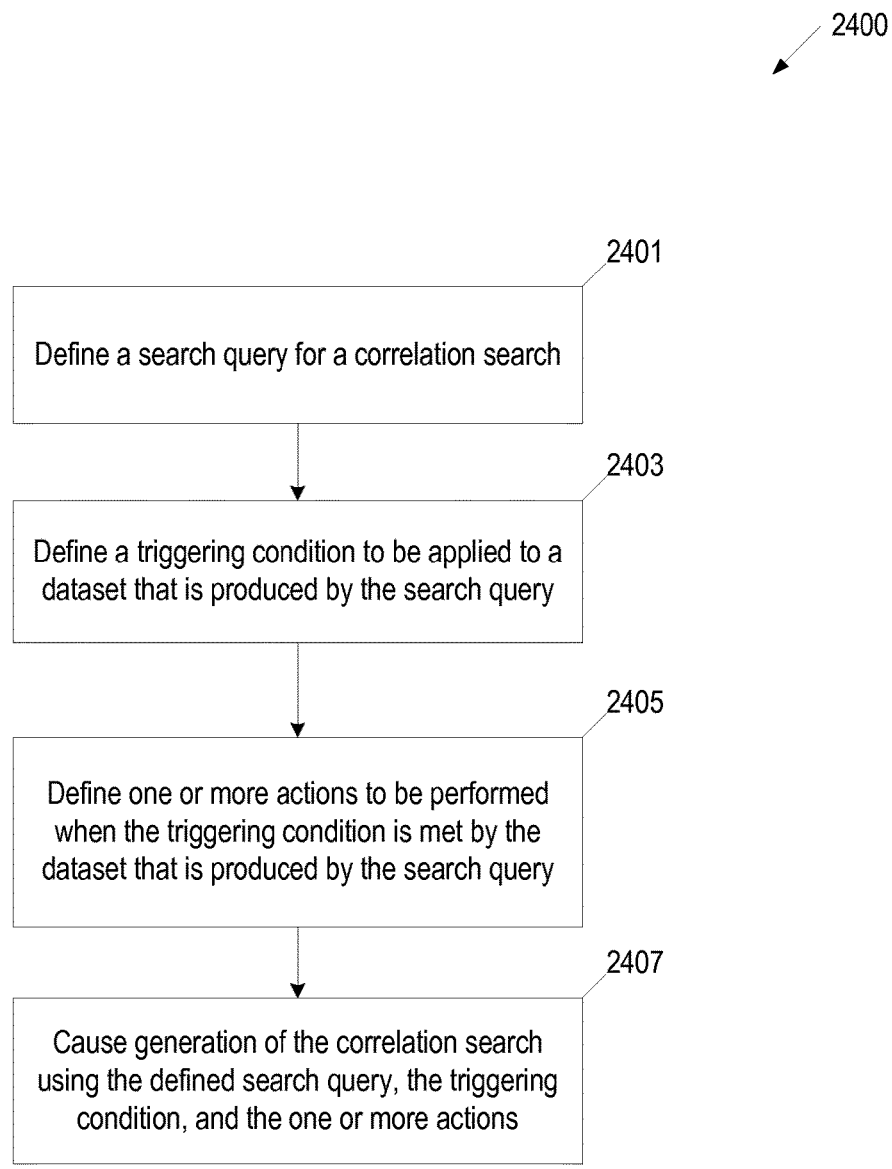
FIG. 24 is a flow diagram of an implementation of a method for creating and/or editing a correlation search via a wizard, in accordance with one or more aspects of the present disclosure.

FIG. 24 is a flow diagram of an implementation of a method 2400 for creating and/or editing a correlation search via a wizard, in accordance with one or more aspects of the present disclosure. The method may be performed by processing logic that may comprise hardware (circuitry, dedicated logic, etc.), software (such as is run on a general purpose computer system or a dedicated machine), or a combination of both. In one implementation, the method 2400 is performed by the client computing machine. In another implementation, the method 2400 is performed by a server computing machine coupled to the client computing machine over one or more networks.

At block 2401, the computing machine defines a search query for a correlation search. The search query can be defined using GUIs described above in conjunction with FIGS. 3-18. The defining of the search query is described in greater detail below in conjunction FIGS. 25-26. At block 2403, the computing machine defines a triggering condition to be applied to a dataset that is produced by the search query. The dataset that is produced by the search query can include data derived using a late binding schema. A late binding schema is described in greater detail below. The triggering condition can be defined using a GUI described above in conjunction with FIG. 19. The defining of the triggering condition is described in greater detail below in conjunction FIG. 27. At block 2405, the computing machine defines one or more actions to be performed when the triggering condition is met by the dataset that is produced by the search query. The one or more actions can be defined using a GUI described above in conjunction with FIG. 23. The defining of the one or more actions is described in greater detail below in conjunction FIG. 28. In one example, the dataset satisfies the triggering condition each time the dataset includes an indicator that the search criteria of the search query are satisfied. In another example, the dataset includes a number of times the search criteria of the search query are satisfied and the dataset satisfies the triggering condition when the number of times exceeds a threshold. In another example, the dataset satisfies the triggering condition when an aggregated statistic pertaining to the dataset exceeds a threshold, is under a threshold, or is within a specified range. At block 2407, the computing machine causes the generation of the correlation search using the defined search query, the triggering condition, and the one or more actions. The correlation search can be created using GUIs described above in conjunction with FIG. 23. The creation of the correlation search can include determining the search processing language for the correlation search based on the defined search query, triggering condition, and action(s).

Figure 25:
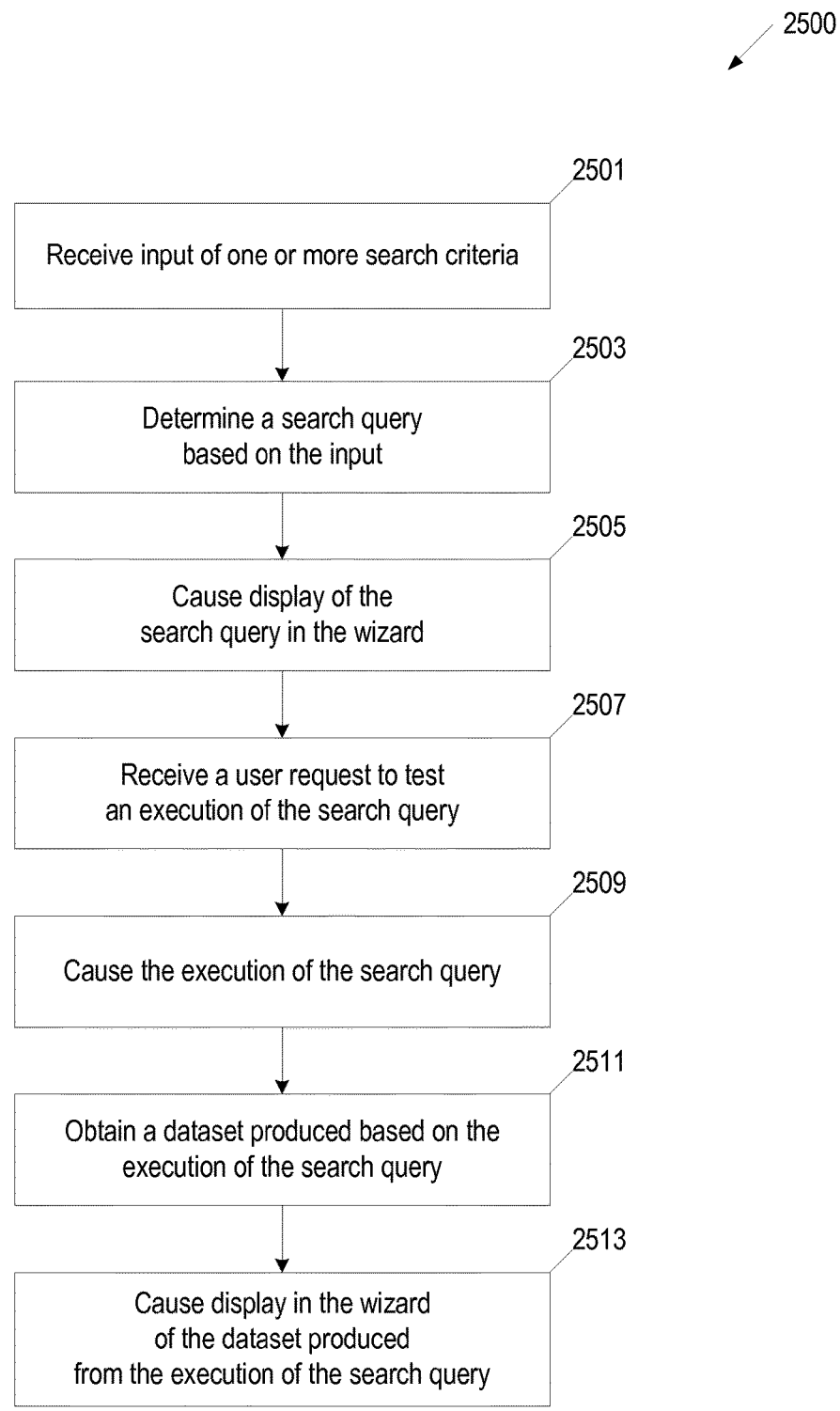
FIG. 25 is a flow diagram of an implementation of a method for defining a search query for a correlation search via a wizard, in accordance with one or more aspects of the present disclosure.

FIG. 25 is a flow diagram of an implementation of a method 2500 for defining a search query for a correlation search via a wizard, in accordance with one or more aspects of the present disclosure. The method may be performed by processing logic that may comprise hardware (circuitry, dedicated logic, etc.), software (such as is run on a general purpose computer system or a dedicated machine), or a combination of both. In one implementation, the method 2500 is performed by the client computing machine. In another implementation, the method 2500 is performed by a server computing machine coupled to the client computing machine over one or more networks.

At block 2501, the computing machine receives input of one or more search criteria, as described above in conjunction with GUIs in FIGS. 4-18. The input can include, for example, a lookup file, a data model, a data sub-model, a time range, a filter, input for creating one or more statistics types, fields for split-by operations, aliases. At block 2503, the computing machine determines a search query based on the input of the search criteria. The determining of the search query can include identifying search processing language that corresponds to the input. One implementation of determining of the search query is described in greater detail below in conjunction with FIGS. 29A-B.

At block 2505, the computing machine causes display of the search query in the wizard. The search query corresponds to a search language that uses a late binding schema. The search query can be displayed in one or more GUIs of the wizard, as described above in conjunction with GUIs in FIGS. 2, 12, 13, 20, and 23. The search query can be displayed in one or more GUIs for executing the search query as described above in conjunction with GUIs in FIGS. 14, 21, and 22. At block 2507, the computing machine may receive a user request to the test an execution of the search query, as described above in conjunction with GUIs in FIGS. 13 and 20. At block 2509, the computing machine causes the execution of the search query. The execution of the search query can be against raw machine data. The execution of the search query can be against time-stamped events that each include a portion of raw machine data. One implementation of causing the execution of the search query is described in greater detail below in conjunction with FIGS. 29A-B. At block 2511, the computing machine obtains a dataset that is produced based on the execution the search query. At block 2513, the computing machine causes display in the wizard of the dataset that is produced from the execution of the search query, as described above in conjunction with GUIs in FIGS. 14, 21, and 22.

Figure 26:
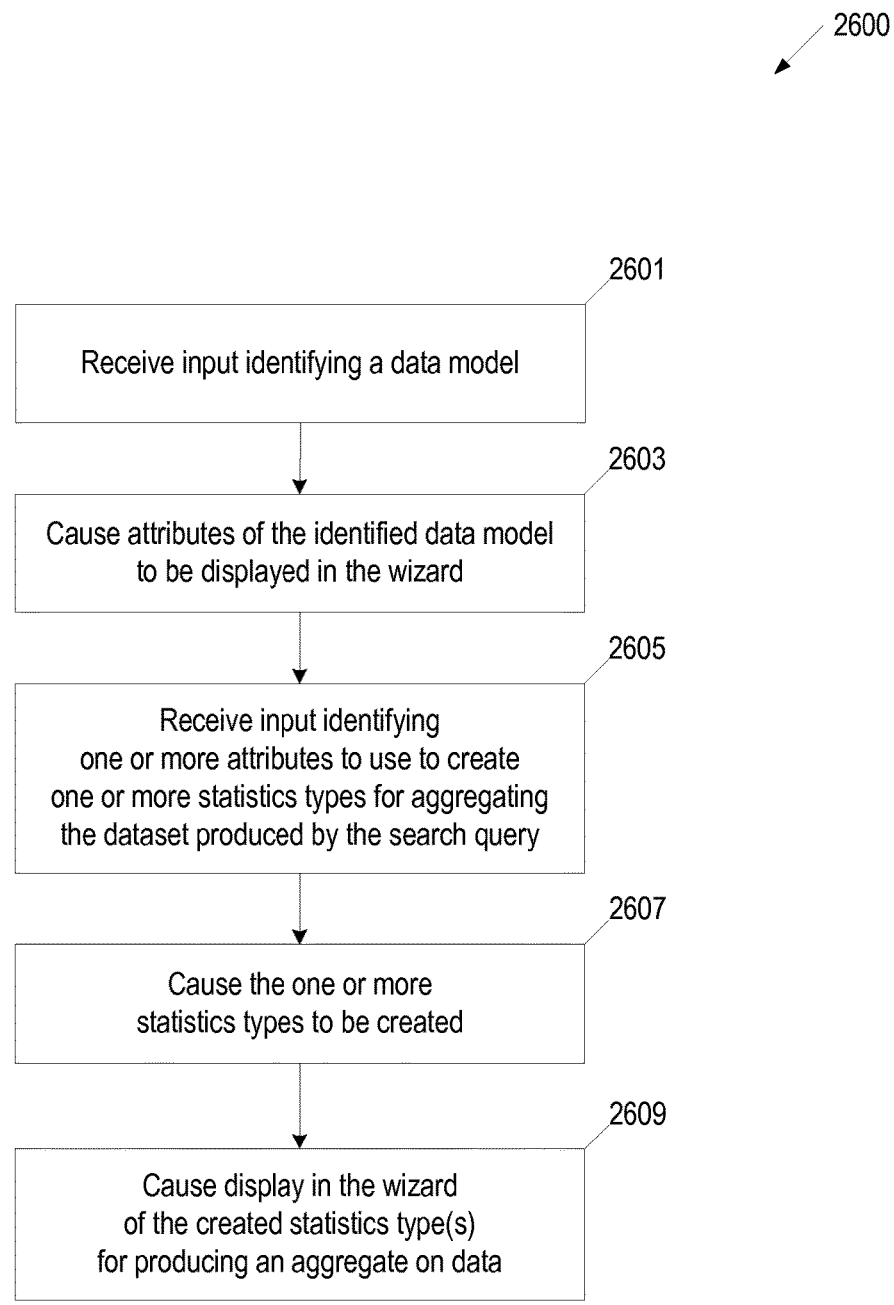
FIG. 26 is a flow diagram of an implementation of a method for defining a search query for a correlation search via a wizard, in accordance with one or more aspects of the present disclosure.

FIG. 26 is a flow diagram of an implementation of a method 2600 for defining a search query for a correlation search via a wizard, in accordance with one or more aspects of the present disclosure. A calculation of a statistics type (aggregate) and/or an evaluation of a statistics type can be part of the search query. The method may be performed by processing logic that may comprise hardware (circuitry, dedicated logic, etc.), software (such as is run on a general purpose computer system or a dedicated machine), or a combination of both. In one implementation, the method 2600 is performed by the client computing machine. In another implementation, the method 2600 is performed by a server computing machine coupled to the client computing machine over one or more networks.

At block 2601, the computing machine receives input identifying a data model, as described above in conjunction with the GUI in FIG. 5. At block 2603, the computing machine causes attributes of the identified data model to be displayed in a GUI of the wizard, as described above in conjunction with the GUI in FIGS. 15A-B. At block 2605, the computing machine receives input identifying one or more attributes to use to create one or more statistics types (aggregates) for aggregating the dataset that is being produced by the search query, as described above in conjunction with the GUI in FIGS. 15A-B. At block 2607, the computing machine causes the one or more statistics types to be created. One implementation of creating the one or more statistics types is described in greater detail below in conjunction with FIGS. 29A-B. At block 2609, the computing machine causes the created statistics types for producing an aggregate on data to be displayed in a GUI of the wizard, as described above in conjunction with the GUI in FIG. 16.

Figure 27:
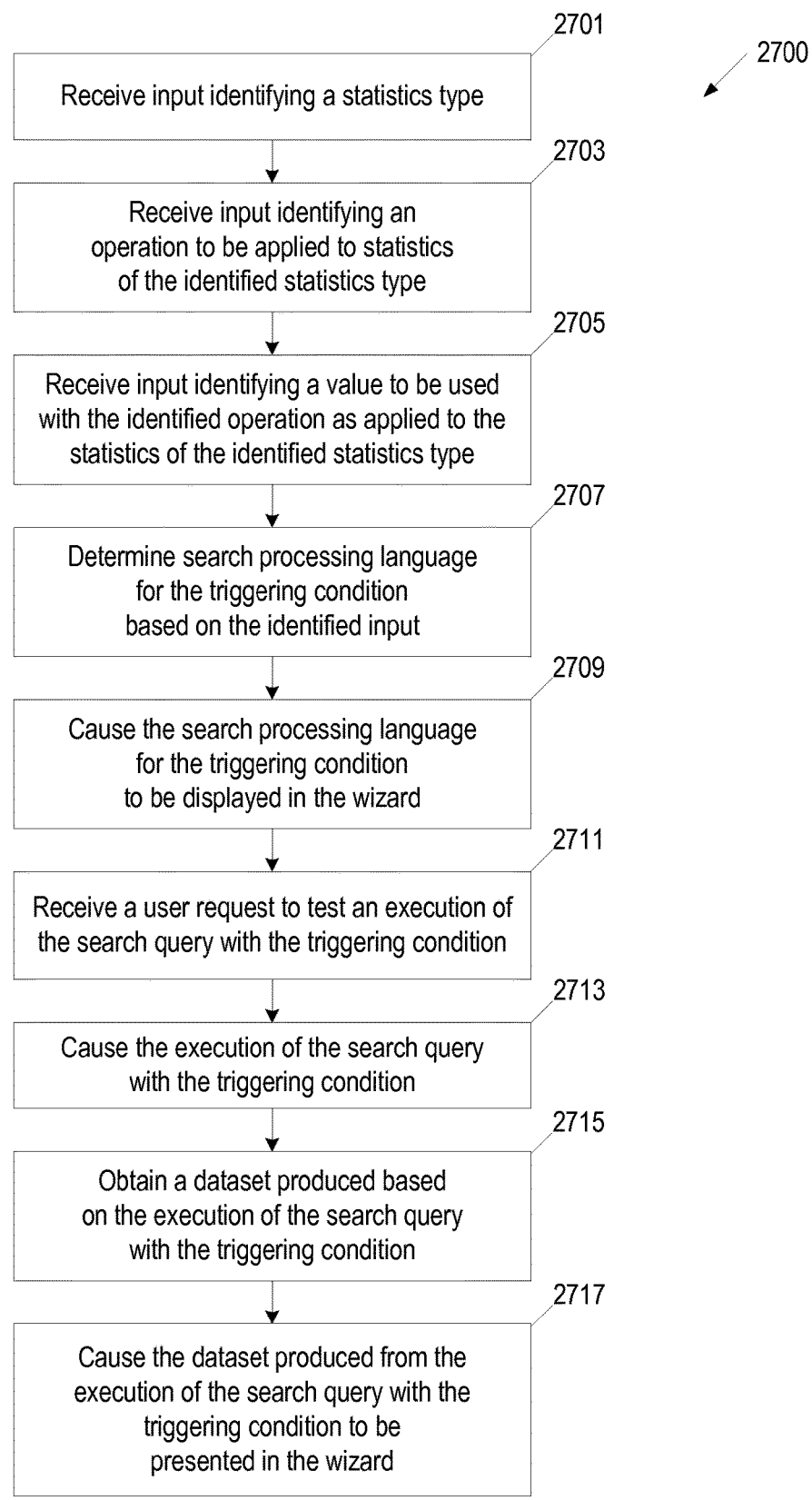
FIG. 27 is a flow diagram of an implementation of a method for defining a triggering condition for a correlation search via a wizard, in accordance with one or more aspects of the present disclosure.

FIG. 27 is a flow diagram of an implementation of a method 2700 for defining a triggering condition for a correlation search via a wizard, in accordance with one or more aspects of the present disclosure. The method may be performed by processing logic that may comprise hardware (circuitry, dedicated logic, etc.), software (such as is run on a general purpose computer system or a dedicated machine), or a combination of both. In one implementation, the method 2700 is performed by the client computing machine. In another implementation, the method 2700 is performed by a server computing machine coupled to the client computing machine over one or more networks.

At block 2701, the computing machine receives input identifying a statistics type (aggregate) to define a triggering condition, as described above in conjunction with the GUI 1900 in FIG. 19. For example, the statistics type "count" is identified in GUI 1900. At block 2703, the computing machine receives user input identifying an operation to be applied to statistics of the identifies statistics type, as described above in conjunction with the GUI in FIG. 19. For example, the operation "greater than or equal to" is identified in GUI 1900.

At block 2705, the computing machine receives user input identifying a value to be used with the identified operation as applied to the statistics of the identified statistics type, as described above in conjunction with the GUI in FIG. 19. For example, the value "6" is identified in GUI 1900. At block 2707, the computing machine determines search processing language for the triggering condition based on the identified input (e.g., identified statistics type, identified operation, and identified value). The input can include more than one identified statistics type, more than one operation, and/or more than one value. For example, a user may wish to detect "when the authentication failure count is greater than or equal to 6 and less than or equal to 12". One implementation of determining the search processing language for the triggering condition is described in greater detail below in conjunction with FIGS. 29A-B.

At block 2709, the computing machine causes the search processing language for the triggering condition to be displayed in a GUI of the wizard, as described above in conjunction with the GUI in FIG. 20. At block 2711, the computing machine may receive a user request to test an execution of the search query with the triggering condition, as described above in conjunction with the GUI in FIG. 20. At block 2713, the computing machine causes the execution of the search query with the triggering condition, as described above in conjunction with the GUIs in FIGS. 21-22. At block 2715, the computing machine obtains a dataset that is produce based on the execution of the search query with the triggering condition. One implementation of obtaining the dataset is described in greater detail below in conjunction with FIGS. 29A-B. At block 2711, the computing machine causes the dataset that is produced from executing the search query with the triggering condition to be presented in a GUI, as described above in conjunction with the GUI in FIG. 22.

Figure 28:
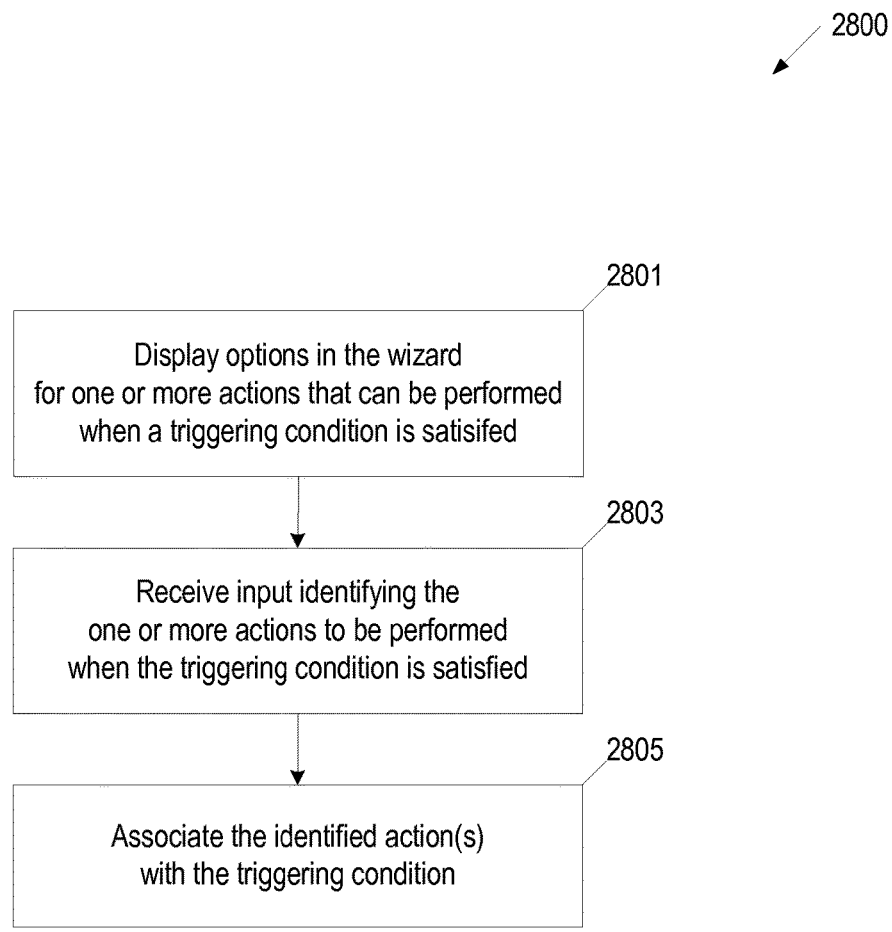
FIG. 28 is a flow diagram of an implementation of a method for defining one or more actions for a correlation search via a wizard, in accordance with one or more aspects of the present disclosure.

FIG. 28 is a flow diagram of an implementation of a method 2800 for defining one or more actions for a correlation search via a wizard, in accordance with one or more aspects of the present disclosure. The method may be performed by processing logic that may comprise hardware (circuitry, dedicated logic, etc.), software (such as is run on a general purpose computer system or a dedicated machine), or a combination of both. In one implementation, the method 2500 is performed by the client computing machine. In another implementation, the method 2500 is performed by a server computing machine coupled to the client computing machine over one or more networks.

At block 2801, the computing machine displays options in a GUI of the wizard for one or more actions that can be performed when a triggering condition is satisfied by the dataset that is produced based on the search query, as described above in conjunction with the GUI in FIG. 23. The options can include, for example, and is not limited to, updating a display with an entry corresponding to satisfaction of the trigger condition being satisfied, adjusting a score or an object to which data causing satisfaction of the triggering condition pertains, or sending a notification indicating satisfaction of the triggering condition. At block 2803, the computing machine receives input identifying one or more of the actions to be performed when the triggering condition is satisfied, as described above in conjunction with the GUI in FIG. 23. At block 2805, the computing machine associates the identified action(s) with the triggering condition, as described above in conjunction with the GUI in FIG. 23.

Figure 29A:
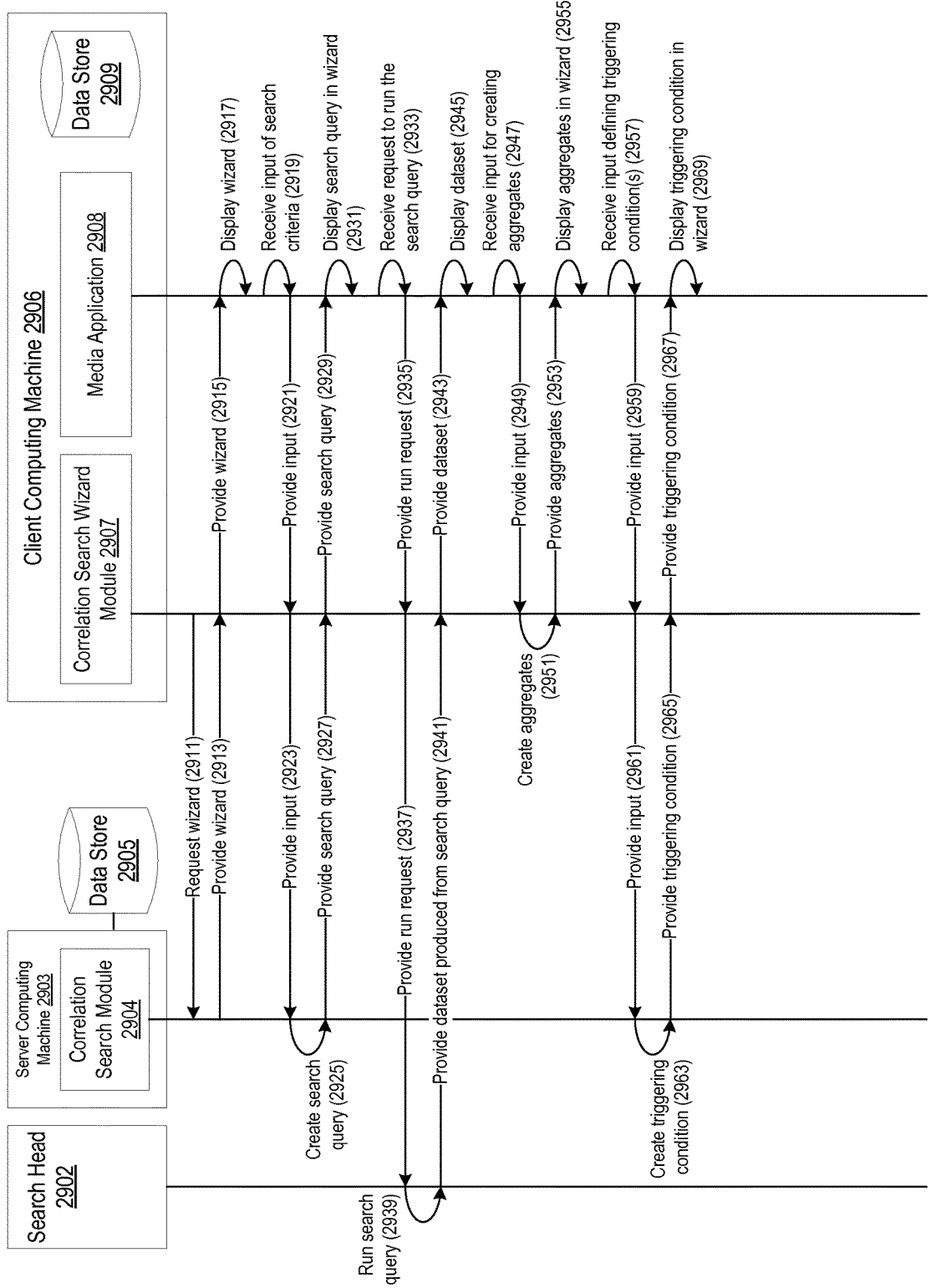
FIGS. 29A-B are block diagrams of an implementation of creating and/or editing a correlation search via a wizard, in accordance with one or more aspects of the present disclosure.
Figure 29B:
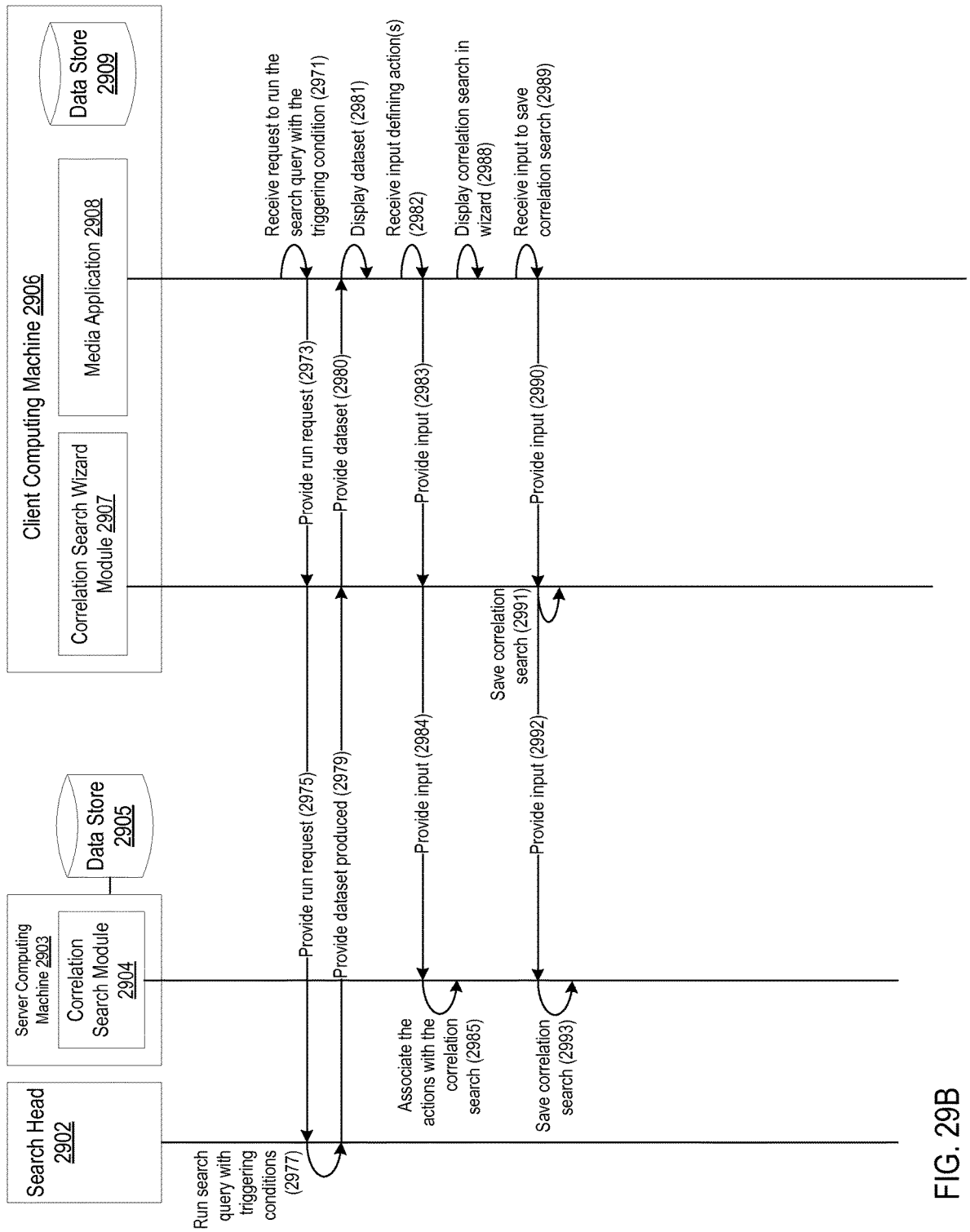

FIGS. 29A-B are block diagrams of an implementation of creating and/or editing a correlation search via a wizard, in accordance with one or more aspects of the present disclosure. A client computing machine 2906 can communicate with one or more server computing machines 2903 and one or more search heads 2902 via one or more networks. A search head 2902 is described in greater detail below in conjunction with FIG. 30.

The client computing machine 2906 can be portable computing devices such as cellular telephones, personal digital assistants (PDAs), portable media players, netbooks, laptop computers, electronic book readers or tablet computers (e.g., that includes a book reader application), set-top boxes, gaming consoles, televisions, and the like. The client computing machine 2906 can include one or more data stores 2909 to store data.

The client computing machine 2906 can run an operating system (OS) that manages hardware and software of the client computing machine 2906. A media application 2908 can run on the client computing machine 2906 (e.g., on the OS of the user devices). For example, the media application 2908 may be a web browser that can access content served by an application server (e.g., server computing machine 2903). In another example, the media application 2908 may be a mobile application (e.g., an app) that can access content served by a mobile application server (e.g., server machine 2903).

The client computing machine 2906 can include a correlation search wizard module 2907 to provide a wizard for generating and/or editing a correlation search. The wizard can include a set of GUIs facilitating user input of (i) one or more search criteria for a search query of the correlation search, (ii) a triggering condition to be applied to a dataset that is produced by the search query, and (iii) one or more actions to be performed when the dataset produced by the search query satisfies the triggering condition. The wizard causes the correlation search to be created based on the user input.

The correlation search wizard module 2907 can send a request 2911 for the wizard to a server computing machine 2903. For example, a user may select a link or a button in a GUI to request the wizard. The server computing machine 2903 can include a correlation search module 2904 to provide the wizard and facilitate user input for generating and/or editing a correlation search. The GUIs for the wizard and the data to be presented in the GUIs of the wizard can be stored in a data store 2905 that is coupled to the server computing machine 2903. The correlation search module 2904 can provide 2913 the wizard to the correlation search wizard module 2907. The correlation search module 2904 can provide one or more GUIs to be rendered by the media application 2908 and data to be displayed in the one or more GUIs. The correlation search wizard module 2907 can provide 2915 the wizard to the media application 2908, and the media application 2908 can display 2917 the wizard on an output device (e.g., display) of the client computing machine 2906.

A GUI of the wizard that is rendered by the media application 2908 can receive 2919 input of search criteria to define a search query for the correlation search. The input can be received as described above in conjunction with the GUIs in FIGS. 2-14. The input can be provided 2921 to the correlation search wizard module 2907, and the correlation search wizard module 2907 can provide 2923 the input to the correlation search module 2904. The correlation search module 2904 can translate the input to corresponding search processing language to create 2925 the search query. The correlation search module can provide 2927 the search query, as represented by the corresponding search processing language, to the correlation search wizard module 2907. The correlation search wizard module 2907 obtains the search query and can provide 2929 the search query to the media application 2908, which can display 2931 the search processing language for search query in one or more GUIs of the wizard. The search processing language for search query can be presented in one or more GUIs of the wizard as described above in conjunction with the GUIs in FIGS. 2, 12, 13.

A GUI of the wizard that is rendered by the media application 2908 can receive 2933 a request to run the search query for the correlation search, for example, to test the criteria of the search query before further defining the correlation search. The input can be received as described above in conjunction with the GUI in FIG. 13. The request can be provided 2935 to the correlation search wizard module 2907, and the correlation search wizard module 2907 can provide 2937 the request to a search head 2902. The search head 2902 can run 2939 the search query and can provide 2941 the dataset that is produced by the search query to the correlation search wizard module 2907. The correlation search wizard module 2907 obtains the dataset and can provide 2943 the dataset that is produced by the search query to the media application 2908, which can display 2945 dataset that is produced by the search query in one or more GUIs. The dataset that is produced by the search query can be presented in one or more GUIs as described above in conjunction with the GUI in FIG. 14.

A GUI of the wizard that is rendered by the media application 2908 can receive 2947 input for creating statistics types (aggregates) for the correlation search. The input can be received as described above in conjunction with the GUI in FIGS. 15A-B. The input can be provided 2949 to the correlation search wizard module 2907, and the correlation search wizard module 2907 can create 2951 the aggregates. The correlation search wizard module 2907 can provide 2953 the aggregates to the media application 2908, which can display 2955 the aggregates in one or more GUIs of the wizard, as described above in conjunction with FIG. 16.

In one implementation, the correlation search module 2904 receives the input of aggregates, alias, and split-by fields from the correlation search wizard module 2907 and translates the input for aggregates, alias, and split-by fields to corresponding search processing language for the aggregates, alias, and split-by fields. The input can be received as described above in conjunction with the GUIs in FIGS. 15A-B through FIG. 18. The search processing language for aggregates, alias, and split-by fields can be displayed in one or more GUIs of the wizard, as described above in conjunction with the GUIs in FIGS. 2, 20, 21, 22, 23.

A GUI of the wizard that is rendered by the media application 2908 can receive 2957 input defining a triggering condition for the correlation search. The input can be received as described above in conjunction with the GUI in FIG. 19. The input can be provided 2959 to the correlation search wizard module 2907, and the correlation search wizard module 2907 can provide 2961 the input to the correlation search module 2904. The correlation search module 2904 can translate the input to corresponding search processing language to create 2963 the triggering condition. The correlation search module can provide 2965 the triggering condition as represented by the corresponding search processing language to the correlation search wizard module 2907. The correlation search wizard module 2907 obtains the triggering condition and can provide 2967 the triggering condition to the media application 2908, which can display 2931 the search processing language for triggering condition in one or more GUIs of the wizard, as described above in conjunction with the GUIs in FIGS. 2, 20, 21, 22, 23. The search processing language for the triggering condition can include search processing language corresponding to aggregates, alias, split-by fields that are associated with the triggering condition.

A GUI of the wizard that is rendered by the media application 2908 can receive 2971 (in FIG. 29B) a request to run the search query and triggering condition for the correlation search, for example, to test the criteria of the search query and the triggering condition before further defining the correlation search. The input can be received as described above in conjunction with the GUI in FIG. 20. The request can be provided 2973 to the correlation search wizard module 2907, and the correlation search wizard module 2907 can provide 2975 the request to a search head 2902. The search head 2902 can run 2977 the search query with the triggering condition and can provide 2979 the dataset that is produced by running the search query with the triggering condition to the correlation search wizard module 2907. The correlation search wizard module 2907 obtains the dataset and can provide 2980 the dataset that is produced by the search query with the triggering condition to the media application 2908, which can display 2981 dataset that is produced by the search query in one or more GUIs, as described above in conjunction with FIGS. 21 and 22.

A GUI of the wizard that is rendered by the media application 2908 can receive 2982 defining one or more actions for the correlation search, for example, to be taken when the triggering condition is met. The input can be received as described above in conjunction with the GUI in FIG. 23. The request can be provided 2983 to the correlation search wizard module 2907, and the correlation search wizard module 2907 can provide 2984 the input to the correlation search module 2904. The correlation search module 2904 can associate the actions with the correlation search. The correlation search module can store the associations of the actions with the correlation search.

The media application 2908 can display 2988 the correlation search, as described above in conjunction with FIGS. 2 and 23. A GUI of the wizard that is rendered by the media application 2908 can receive 2989 input to save the correlation search and any data pertaining to creation and/or editing of the correlation search. The input can be received as described above in conjunction with the GUI in FIG. 23. The data pertaining to creation and/or editing of the correlation search can include the input received and any output produced from the input. The request to save the correlation search can be provided 2990 to the correlation search wizard module 2907. The correlation search wizard module 2907 can save the data pertaining to the correlation search in the data store 2909, and/or the correlation search wizard module 2907 can provide 2992 the input to the correlation search module 2904, and the correlation search module 2904 can save the data pertaining to the correlation search in the data store 2905.

The one or more networks can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof.

In one implementation, the client computing machine (e.g., client computing machine 2906), server computing machines 2903, and search heads 2902 are not directly connected to each other, but are coupled via separate networks.

The computing machines can be a rackmount server computer, a router computer, a personal computer, a portable digital assistant, a mobile phone, a laptop computer, a tablet computer, a camera, a video camera, a netbook, a desktop computer, a media center, or any combination of the above. The server computing machine can provide web applications and/or mobile device applications and data for the mobile device.

A data store can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

In one implementation, the data that is searched by a search query of a correlation search includes data derived using a late binding schema. Late binding schema is described in greater detail below. Implementations of the present disclosure can process real-time data. The systems and methods described herein above may be employed by various data processing systems, e.g., data aggregation and analysis systems. In various illustrative examples, the data processing system may be represented by the SPLUNK®

ENTERPRISE system produced by Splunk Inc. of San Francisco, California, to store and process performance data.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

Figure 30:
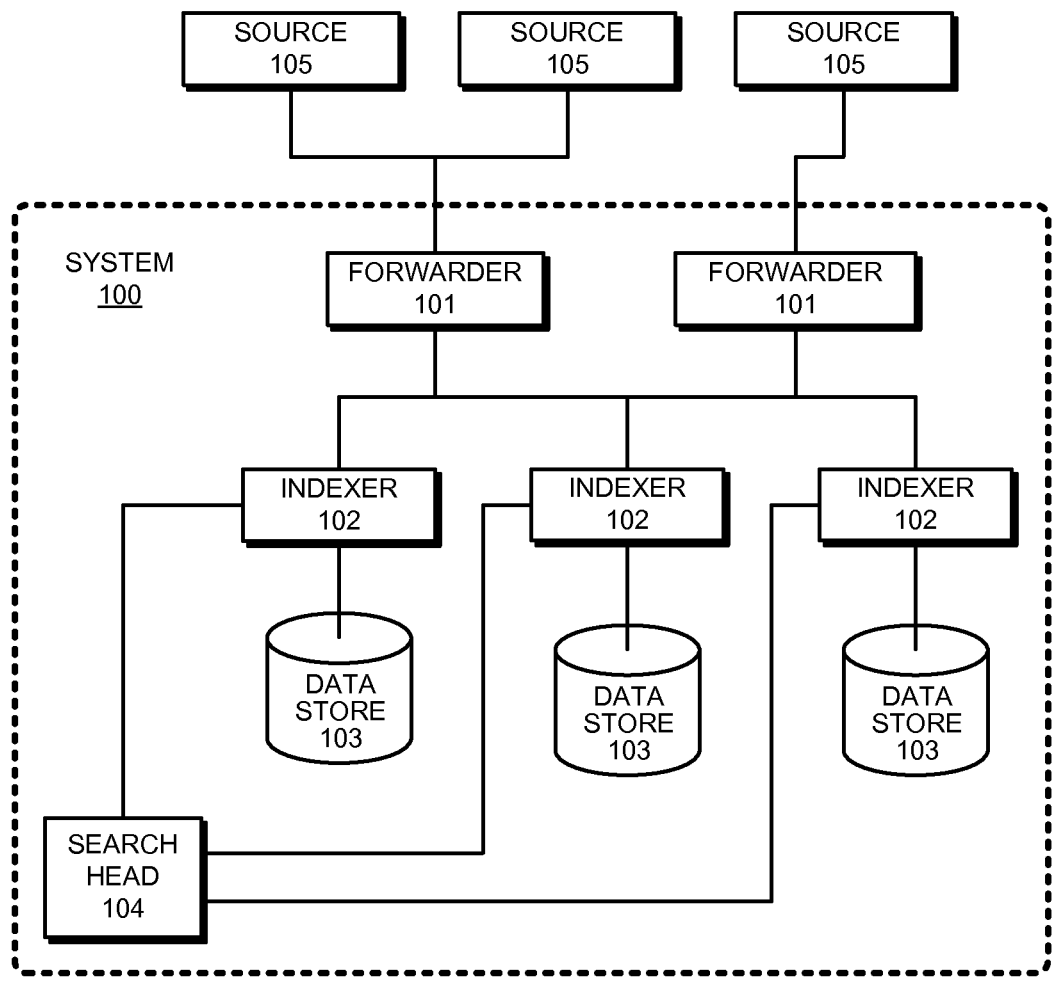
FIG. 30 presents a block diagram of an event-processing system in accordance with one or more aspects of the present disclosure.

FIG. 30 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Figure 31:
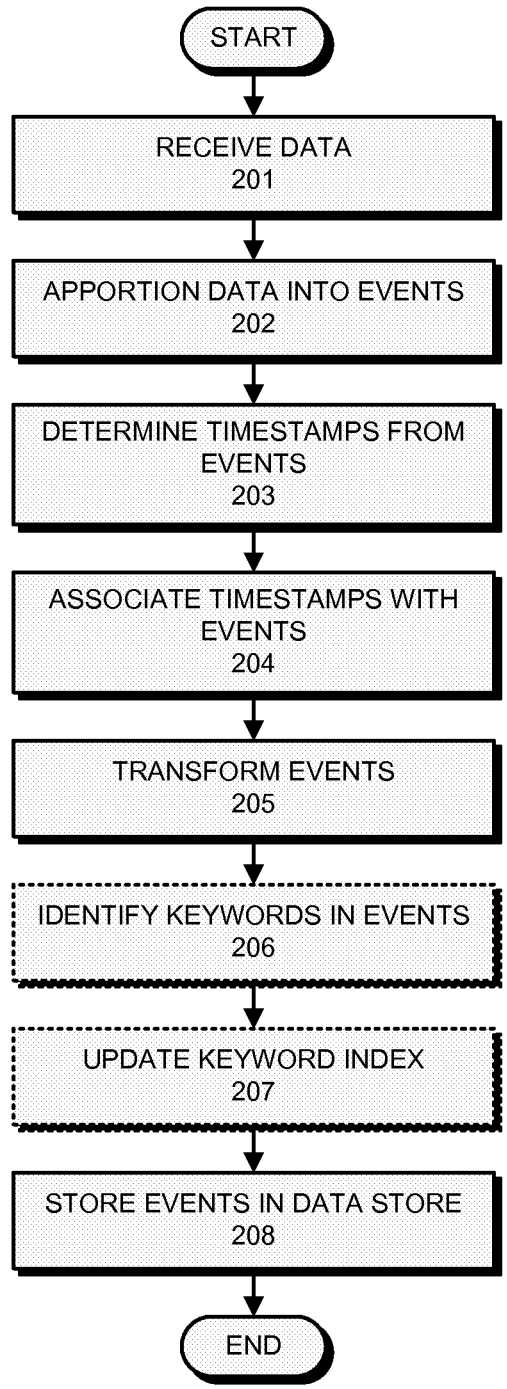
FIG. 31 presents a flowchart illustrating how indexers process, index, and store data received from forwarders in accordance with one or more aspects of the present disclosure.

FIG. 31 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

Figure 32:
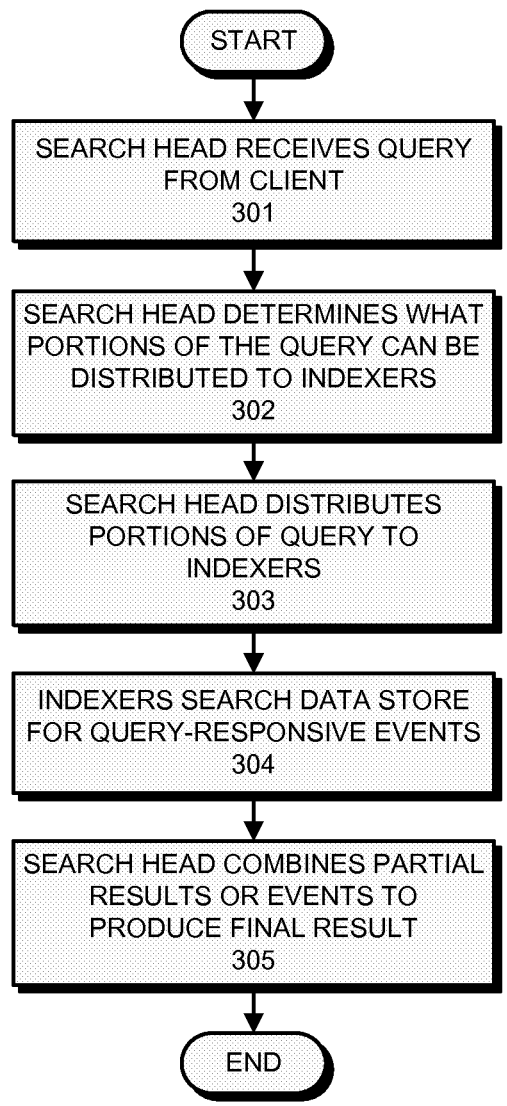
FIG. 32 presents a flowchart illustrating how a search head and indexers perform a search query in accordance with one or more aspects of the present disclosure.

FIG. 32 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Figure 33:
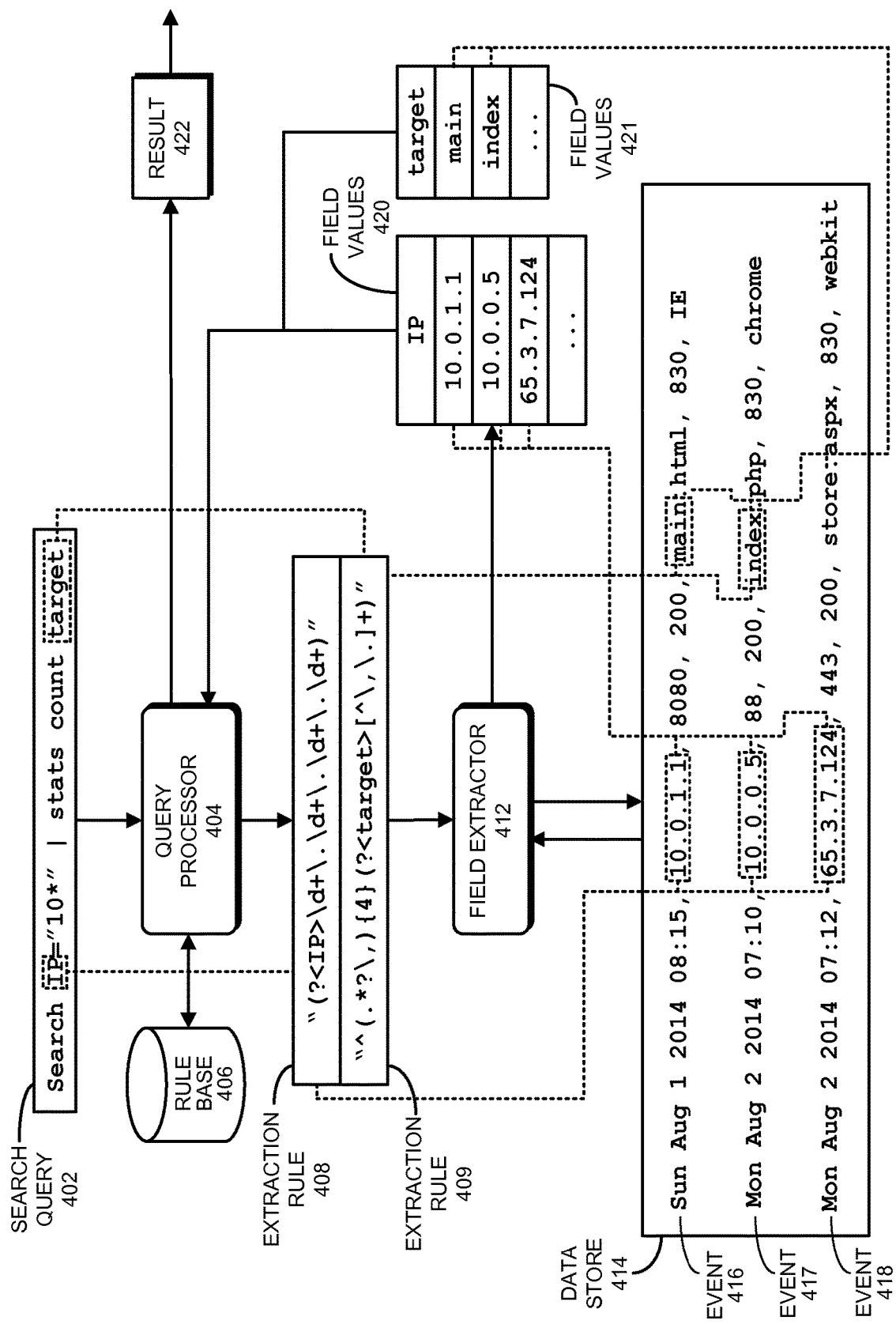
FIG. 33 presents a block diagram of a system for processing search requests that uses extraction rules for field values in accordance with one or more aspects of the present disclosure.

FIG. 33 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 33 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 33, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 33. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

Figure 35A:
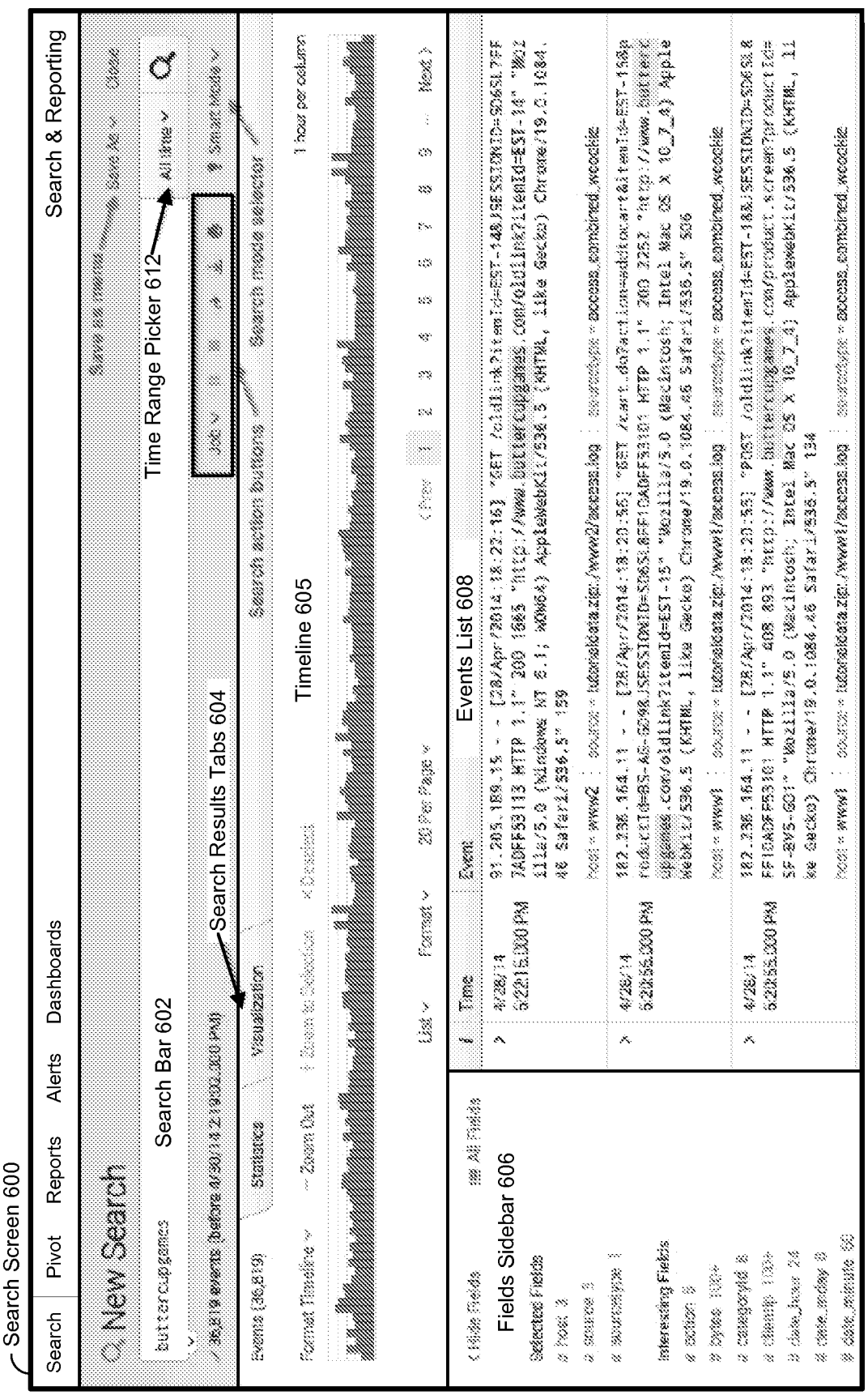
FIG. 35A illustrates a search screen in accordance with one or more aspects of the present disclosure.
Figure 35B:
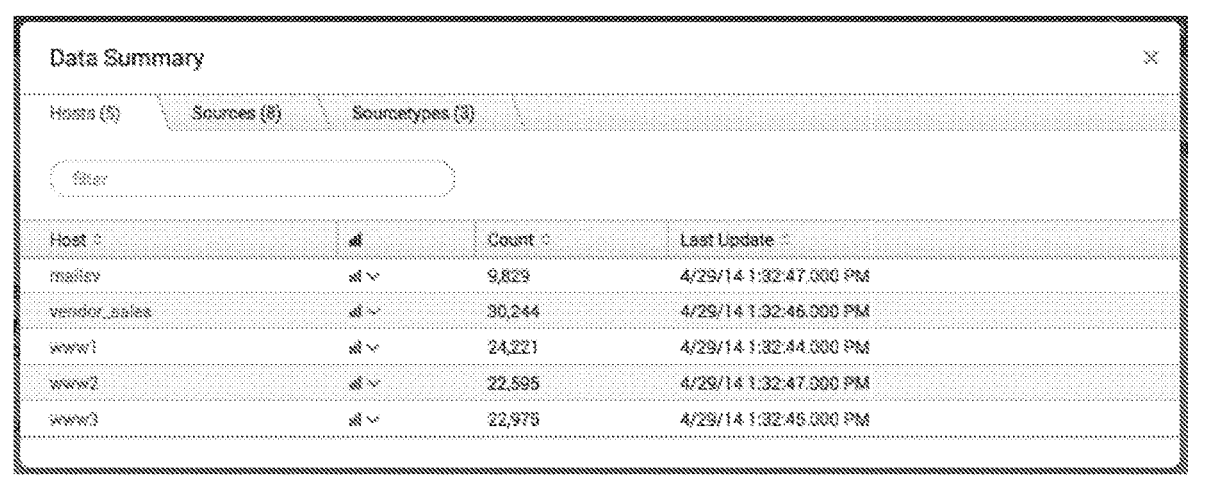

FIG. 35A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 35B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 35A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

To facilitate faster query processing, a query can be structured as a map-reduce computation, wherein the "map" operations are delegated to the indexers, while the corresponding "reduce" operations are performed locally at the search head. For example, FIG. 34 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 32, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

As described above with reference to the flow charts in FIGS. 31-32, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 36A:
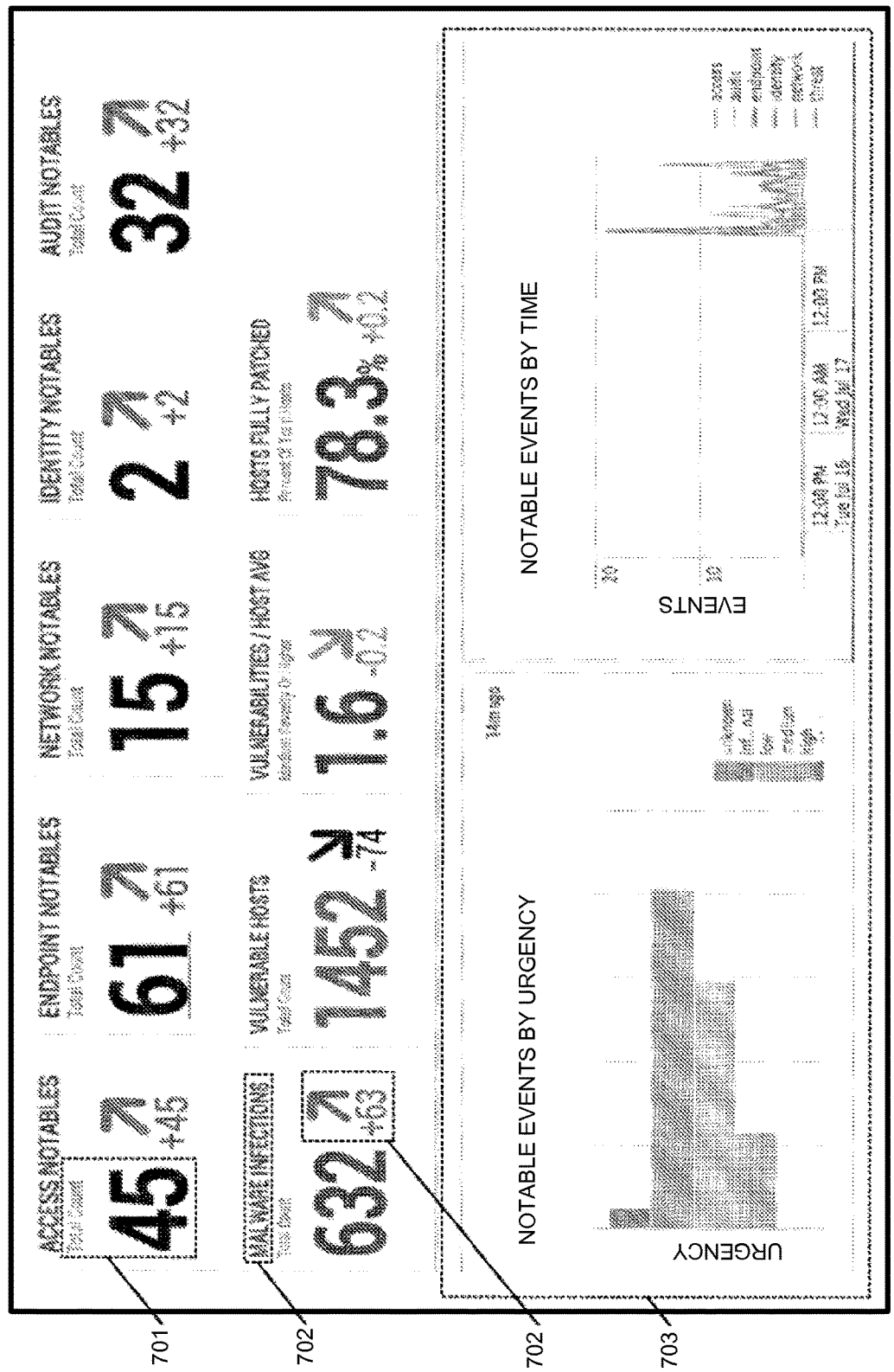
FIG. 36A illustrates a key indicators view in accordance with one or more aspects of the present disclosure.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 36A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 36B:
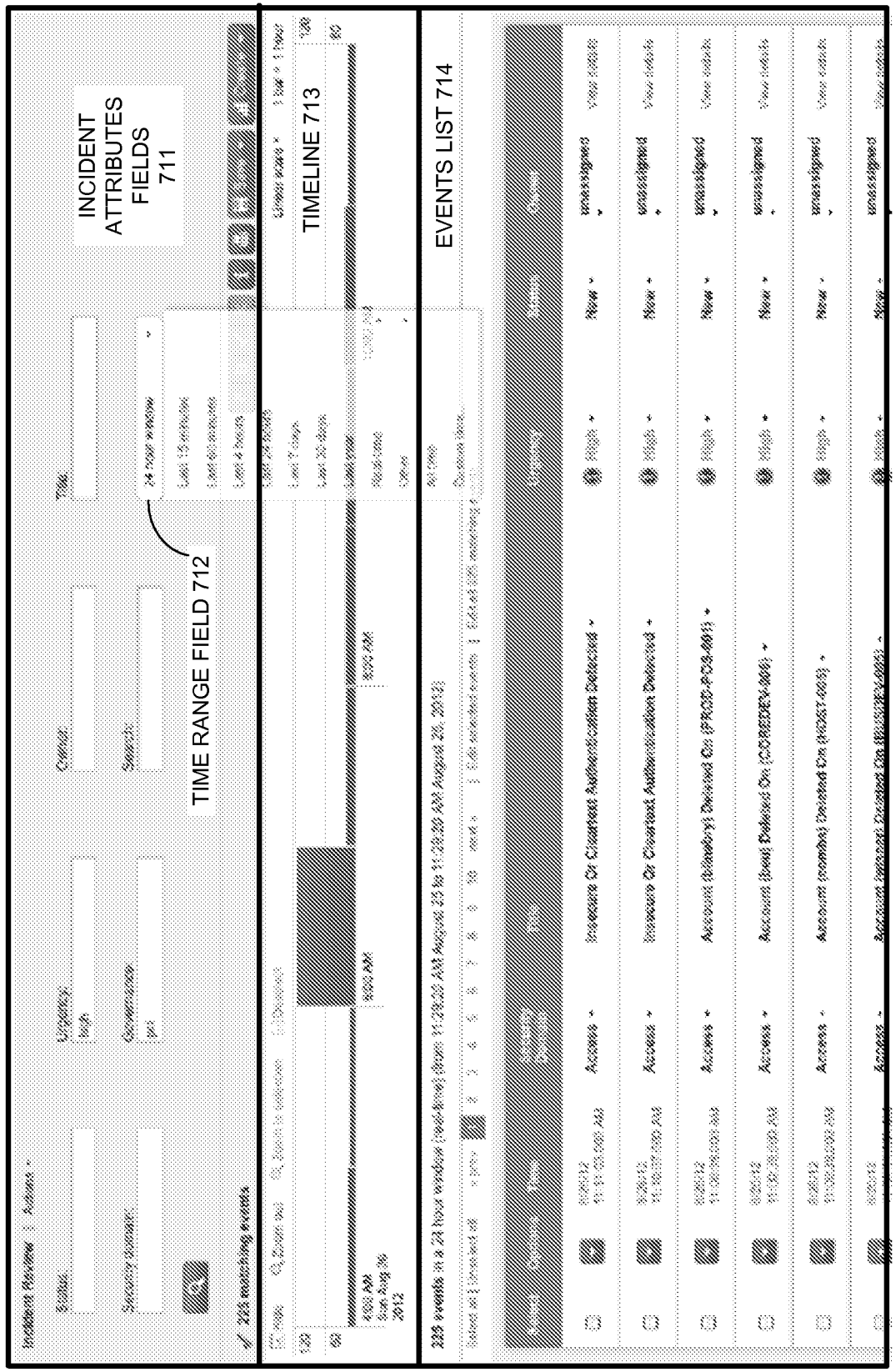
FIG. 36B illustrates an incident review dashboard in accordance with one or more aspects of the present disclosure.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 36B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 36C:
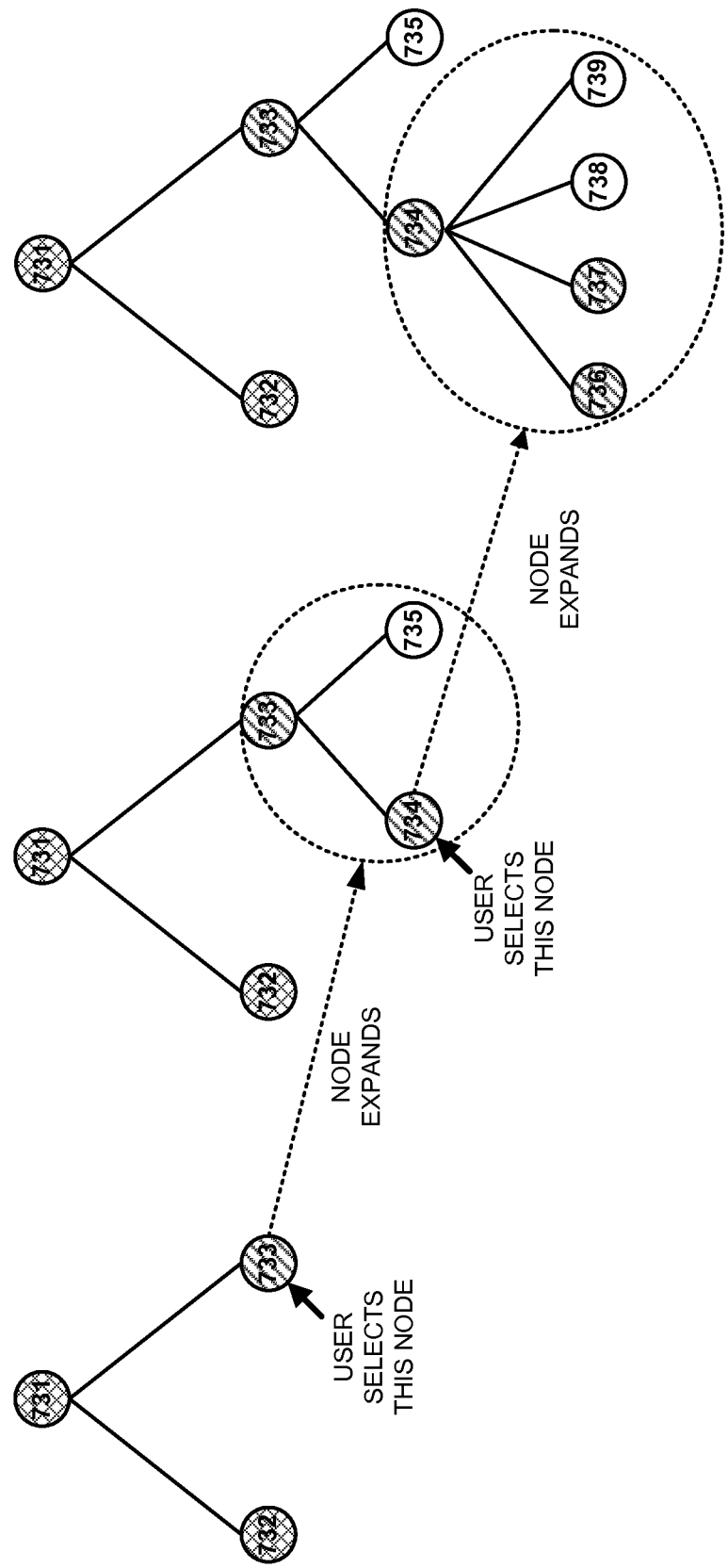
FIG. 36C illustrates a proactive monitoring tree in accordance with one or more aspects of the present disclosure.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 36C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 36D:
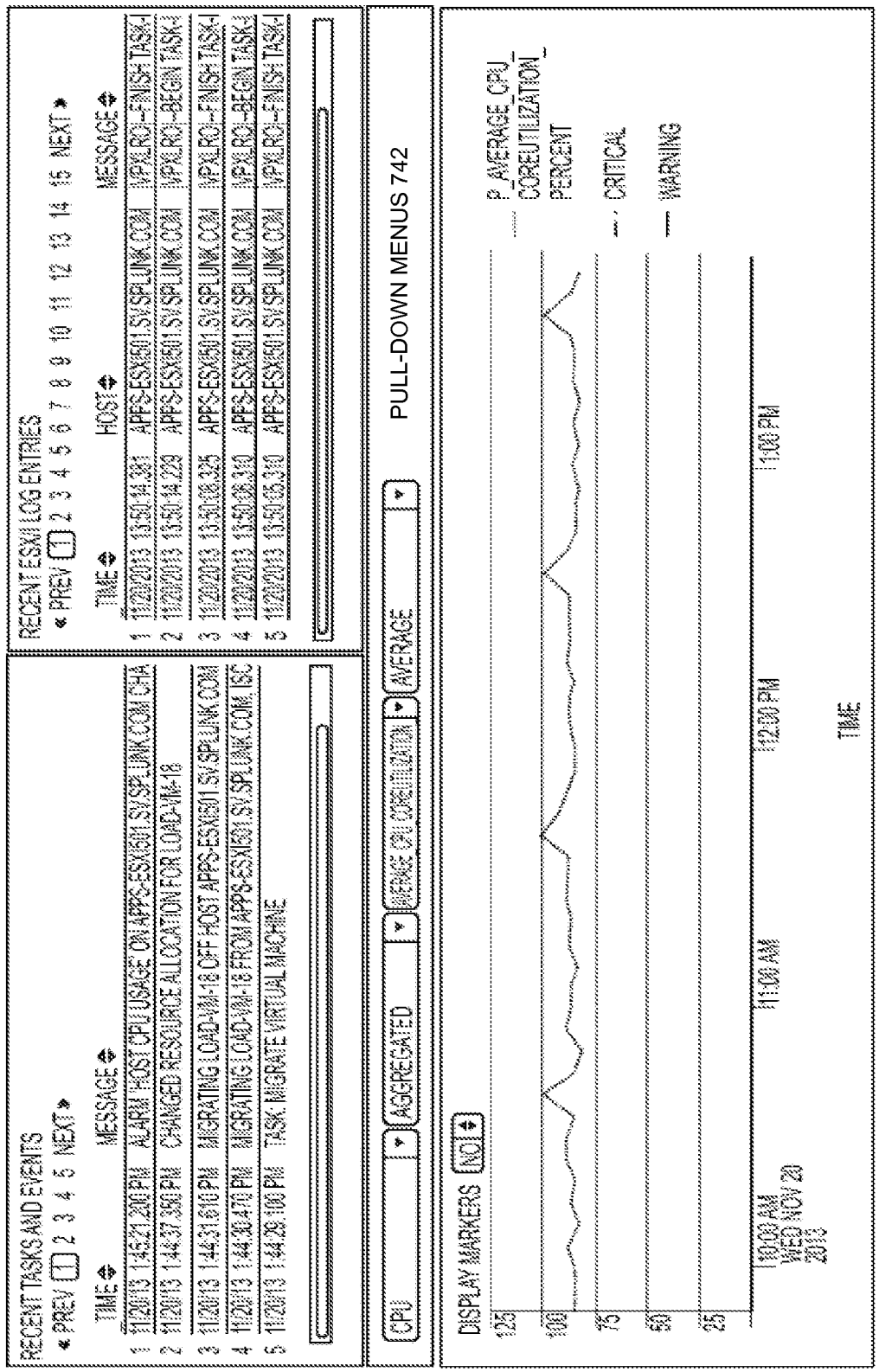
FIG. 36D illustrates a screen displaying both log data and performance data in accordance with one or more aspects of the present disclosure.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 36D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 37:
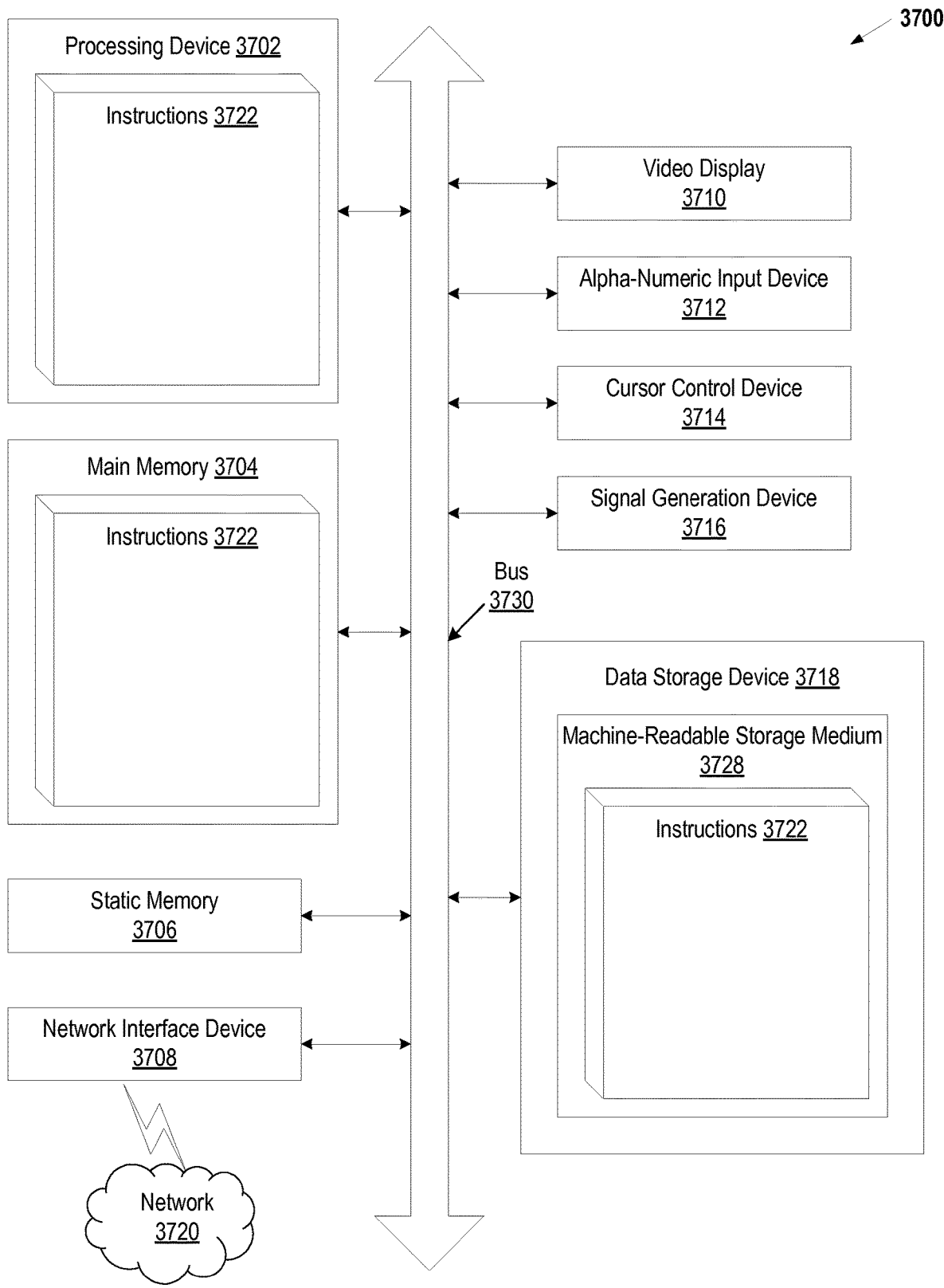
FIG. 37 depicts a block diagram of an example computing device operating in accordance with one or more aspects of the present disclosure.

FIG. 37 illustrates a diagram of a machine in an example form of a computer system 3700 within which a set of instructions, for causing the machine to perform any one or more of the methodologies discussed herein, may be executed. The computer system 3700 can be client computing machine 2906 in FIGS. 29A-B. The computer system 3700 can be server computing machine 2903 in FIGS. 29A-B. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3700 includes a processing device (processor) 3702, a main memory 3704 (e.g., read-only memory (ROM), flash memory, dynamic random access memory (DRAM) such as synchronous DRAM (SDRAM), double data rate (DDR SDRAM), or DRAM (RDRAM), etc.), a static memory 3706 (e.g., flash memory, static random access memory (SRAM), etc.), and a data storage device 3718, which communicate with each other via a bus 3730.

Processor (processing device) 3702 represents one or more general-purpose processing devices such as a microprocessor, central processing unit, or the like. More particularly, the processor 3702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 3702 may also be one or more special-purpose processing devices such as an application specific integrated circuit (ASIC), a field programmable gate array (FPGA), a digital signal processor (DSP), network processor, or the like. The processor 3702 is configured to execute instructions 3722 for performing the operations and steps discussed herein.

The computer system 3700 may further include a network interface device 3708. The computer system 3700 also may include a video display unit 3710 (e.g., a liquid crystal display (LCD) or a cathode ray tube (CRT)), an input device 3712 (e.g., a keyboard, and alphanumeric keyboard, a motion sensing input device, touch screen), a cursor control device 3714 (e.g., a mouse), and a signal generation device 3716 (e.g., a speaker).

The data storage device 3718 can include a computer-readable storage medium 3728 on which is stored one or more sets of instructions 3722 (e.g., software) embodying any one or more of the methodologies or functions described herein. The instructions 3722 can also reside, completely or at least partially, within the main memory 3704 and/or within the processor 3702 during execution thereof by the computer system 3700, the main memory 3704 and the processor 3702 also constituting computer-readable storage media. The instructions 3722 may further be transmitted or received over a network 3720 via the network interface device 1008.

In one implementation, the instructions 1022 include instructions for a correlation search wizard module (e.g., correlation search wizard module 2907 in FIGS. 29A-B) and/or a software library containing methods that call the correlation search wizard module. In one implementation, the instructions 1022 include instructions for a correlation search module (e.g., correlation search module 2904 in FIGS. 29A-B) and/or a software library containing methods that call the correlation search module. While the computer-readable storage medium 3728 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "causing", "receiving", "obtaining", "displaying", "associating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
   receiving, via a graphical user interface (GUI), a user input pertaining to a definition of a search query for a correlation search of a data store, the data store comprising time-stamped events that each include machine data reflecting activity in an information technology environment and produced by a component of the information technology environment;
   causing display in the GUI of a dataset that has been produced by executing the search query;
   receiving, via the GUI, first user input that identifies one or more fields of the dataset produced by executing the search query, wherein the first user input further defines a triggering condition to be evaluated based on aggregated statistics of values of the one or more fields of the dataset produced by executing the search query;
   receiving, via the GUI, second user input identifying, for a throttling condition, a time period and a value for each of one or more specified dataset fields, wherein the throttling condition is satisfied when the dataset produced by the search query includes the identified value in each of the one or more specified dataset fields;
   receiving, via the GUI, third user input identifying one or more actions to be performed when the triggering condition, which is evaluated based on the aggregated statistics of the values of the one or more fields of the dataset produced by executing the search query, is satisfied, wherein evaluation of the triggering condition based on the aggregated statistics of the values of the one or more fields of the dataset produced by executing the search query is suppressed for the identified time period when the dataset produced by the search query satisfies the throttling condition;
   automatically generating, using search processing language, a statement to define the search query and the triggering condition;
   executing the search processing language to generate the dataset produced by the search query and to evaluate the triggering condition;
   causing display, in the GUI, of results of the execution of the search processing language; and
   in view of the results of the execution of the search processing language, causing generation of the correlation search using the search query, the triggering condition, and the one or more actions, the correlation search comprising updated search processing language having the search query and a processing command for criteria on which the triggering condition is based.

2. The method of claim 1, wherein causing generation of the correlation search comprises:
   receiving one or more search criteria;
   causing display of the search query in the GUI;
   causing execution of the search query; and
   causing display of results from the search query.

3. The method of claim 1, further comprising:
   causing display in the GUI of a plurality of statistics types that can be used for producing aggregate statistics of data;

receiving through the GUI input identifying one of the plurality of statistics types;

receiving input identifying an evaluation of the aggregate statistics produced by the statistics type; and wherein causing generation of the correlation search comprises including the evaluation of the aggregate statistics produced by the statistics type in the search query or the evaluation of the triggering condition based on the aggregate statistics produced by the statistics type in the correlation search.

4. The method of claim 1, further comprising persisting the correlation search in memory for later selection, wherein persisting the correlation search comprises:

receiving a user request to test an execution of the search query with the triggering condition; and obtaining, for presentation, the dataset produced based on the execution of the search query with the triggering condition.

5. The method of claim 4, wherein persisting the correlation search comprises:

displaying in the GUI options for the one or more actions to be performed when the triggering condition evaluated is satisfied;

receiving a user selection of the one or more actions to be performed;

associating the one or more actions with the triggering condition;

receiving one or more user inputs identifying throttling parameters, the throttling parameters comprising the time period and one or more specified values for one or more fields of the dataset produced by executing the search query; and defining, based on the throttling parameters, the throttling condition for the one or more actions to be performed, wherein the throttling condition causes the evaluation of the triggering condition to be suppressed for the time period when the one or more fields of the dataset produced by executing the search query include the one or more specified values.

6. The method of claim 1, wherein the one or more actions comprise one or more of updating a display with an entry corresponding to satisfaction of the triggering condition, adjusting a score of an object to which data causing satisfaction of the triggering condition pertains, or sending a notification indicating satisfaction of the triggering condition.

7. The method of claim 1, further comprising providing an indication in the GUI of whether the search query parses successfully.

8. The method of claim 1, wherein the search query corresponds to a search language that uses a late binding schema.

9. The method of claim 1, further comprising causing execution of the search query against the machine data.

10. The method of claim 1, further comprising causing execution of the search query against the time-stamped events.

11. The method of claim 1, further comprising causing display of one or more time-stamped events that resulted in the triggering condition being satisfied.

12. The method of claim 1, wherein the triggering condition is satisfied when the aggregated statistics of the values of the one or more fields of the dataset produced by the search query exceeds a threshold, is under a threshold, or is within a specified range.

13. The method of claim 1, wherein the definition of the search query specifies search criteria that comprises at least a time range within which timestamps of the time-stamped events are to fall to be within a scope of the search query, the time range comprising a rolling time window that defines which of the time-stamped events are to be within the scope of the search query, wherein the time range specifies the scope of the search query in relation to a current time.

14. The method of claim 1, wherein the correlation search is utilized to process real-time data of the dataset.

15. The method of claim 1, wherein the time-stamped events are stored in the data store as unstructured data without a predefined format.

16. The method of claim 1, wherein the triggering condition is satisfied more than once by filtered events produced by a single execution of the search query, and wherein the one or more actions execute each time the triggering condition is satisfied.

17. The method of claim 1, further comprising receiving the definition of the aggregated statistics of the values of the one or more fields of the dataset produced by the search query.

18. The method of claim 17, wherein receiving the definition of the aggregated statistics of the values of the one or more fields of the dataset produced by the search query further comprises:

receiving a definition of a separation of the aggregated statistics by distinct values of one or more fields of the dataset produced by the search query.

19. A system comprising:

a memory; and a processing device coupled with the memory to:

receive, via a graphical user interface (GUI), a user input pertaining to a definition of a search query for a correlation search of a data store, the data store comprising time-stamped events that each include machine data reflecting activity in an information technology environment and produced by a component of the information technology environment;

cause display in the GUI of a dataset that has been produced by executing the search query;

receive, via the GUI, first user input that identifies one or more fields of the dataset produced by executing the search query, wherein the first user input further defines a triggering condition to be evaluated based on aggregated statistics of values of the one or more fields of the dataset produced by executing the search query;

receive, via the GUI, second user input identifying, for a throttling condition, a time period and a value for each of one or more specified dataset fields, wherein the throttling condition is satisfied when the dataset produced by the search query includes the identified value in each of the one or more specified dataset fields;

receive, via the GUI, third user input identifying one or more actions to be performed when the triggering condition, being which is evaluated based on the aggregated statistics of the values of the one or more fields of the dataset produced by executing the search query, is satisfied, wherein evaluation of the triggering condition based on the aggregated statistics of the values of the one or more fields of the dataset produced by executing the search query is suppressed for the identified time period when the dataset produced by the search query satisfies the throttling condition;

automatically generate, using search processing language, a statement to define the search query and the triggering condition;

execute the search processing language to generate the dataset produced by the search query and to evaluate the triggering condition;

cause display, in the GUI, of results of the execution of the search processing language; and in view of the results of the execution of the search processing language, cause generation of the correlation search using the search query, the triggering condition, and the one or more actions, the correlation search comprising updated search processing language having the search query and a processing command for criteria on which the triggering condition is based.

20. A non-transitory computer readable storage medium encoding instructions thereon that, in response to execution by one or more processing devices, cause the processing device to perform operations comprising:

receiving, via a graphical user interface (GUI), a user input pertaining to a definition of a search query for a correlation search of a data store, the data store comprising time-stamped events that each include machine data reflecting activity in an information technology environment and produced by a component of the information technology environment;

causing display in the GUI of a dataset that has been produced by executing the search query;

receiving, via the GUI, first user input that identifies one or more fields of the dataset produced by executing the search query, wherein the first user input further defines a triggering condition to be evaluated based on aggregated statistics of values of the one or more fields of the dataset produced by executing the search query;

receiving, via the GUI, second user input identifying, for a throttling condition, a time period and a value for each of one or more specified dataset fields, wherein the throttling condition is satisfied when the dataset produced by the search query includes the identified value in each of the one or more specified dataset fields;

receiving, via the GUI, third user input identifying one or more actions to be performed when the triggering condition, being which is evaluated based on the aggregated statistics of the values of the one or more fields of the dataset produced by executing the search query, is satisfied, wherein evaluation of the triggering condition based on the aggregated statistics of the values of the one or more fields of the dataset produced by executing the search query is suppressed for the identified time period when the dataset produced by the search query satisfies the throttling condition;

automatically generating, using search processing language, a statement to define the search query and the triggering condition;

executing the search processing language to generate the dataset produced by the search query and to evaluate the triggering condition;

causing display, in the GUI, of results of the execution of the search processing language; and in view of the results of the execution of the search processing language, causing generation of the correlation search using the search query, the triggering condition, and the one or more actions, the correlation search comprising updated search processing language having the search query and a processing command for criteria on which the triggering condition is based.

* * * * *